(12) United States Patent
Gonzalez Aguirre et al.

(10) Patent No.: US 12,347,228 B2
(45) Date of Patent: Jul. 1, 2025

(54) SYSTEMS AND METHODS FOR PRIVACY-PRESERVING FACEMASK-COMPLIANCE-LEVEL MEASUREMENT

(71) Applicant: Intel Corporation, Santa Clara, CA (US)

(72) Inventors: David Gonzalez Aguirre, Portland, OR (US); Julio Zamora Esquivel, Zapopan (MX); Javier Felip Leon, Hillsboro, OR (US); Ignacio J. Alvarez, Portland, OR (US)

(73) Assignee: Intel Corporation, Santa Clara, CA (US)

(*) Notice: Subject to any disclaimer, the term of this patent is extended or adjusted under 35 U.S.C. 154(b) by 681 days.

(21) Appl. No.: 17/247,847

(22) Filed: Dec. 26, 2020

(65) Prior Publication Data

US 2021/0117649 A1    Apr. 22, 2021

(51) Int. Cl.
| | | |
|---|---|---|
| *G06V 40/16* | (2022.01) | |
| *G06V 10/58* | (2022.01) | |
| *G06V 10/75* | (2022.01) | |
| *G06V 10/82* | (2022.01) | |

(52) U.S. Cl.
CPC .......... *G06V 40/168* (2022.01); *G06V 10/758* (2022.01); *G06V 10/82* (2022.01); *G06V 40/161* (2022.01); *G06V 10/58* (2022.01)

(58) Field of Classification Search
CPC .. G06V 40/168; G06V 40/161; G06V 10/758; G06V 10/82; G06V 10/58
See application file for complete search history.

(56) References Cited

U.S. PATENT DOCUMENTS 10,657,711 B2    5/2020 Gonzalez Aguirre
2019/0236342 A1*   8/2019 Madden ............... G06V 40/167

FOREIGN PATENT DOCUMENTS

WO    2020206850    10/2020
WO    WO-2020206850 A1 * 10/2020 ........... G06F 18/214

OTHER PUBLICATIONS

Jahanbin et al., "Three dimensional face recognition using wavelet decomposition of range images." 2007, IEEE International Conference on Image Processing. (Year: 2007).*

(Continued)

*Primary Examiner* — Kenny A Cese
(74) *Attorney, Agent, or Firm* — Schwegman Lundberg & Woessner, P.A.

(57) ABSTRACT

Disclosed herein are systems and methods for privacy-preserving facemask-compliance-level measurement. In an embodiment, a mask-compliance measurement system includes a processor that is configured to generate, from an image of a person, a facial depth image of a region of a face of the person, and to generate facial wavelet descriptors from the facial depth image. The processor is also configured to determine spectral-density values of the wavelet descriptors, and to analyze the spectral-density values to generate a mask-wearing-compliance result for the person. In an embodiment, the analyzing includes using a classification model that is trained to classify sets of spectral-density values with respect to facemask wearing in images from which the spectral-density values were derived.

25 Claims, 13 Drawing Sheets

(56) References Cited

OTHER PUBLICATIONS

Jahanbin, "Three Dimensional Face Recognition using Wavelet Decomposition of Range Images", 2007 IEEE International Conference on Image Processing. (Year: 2007).*

Ghasemzadeh et al., "3D discrete wavelet transform-based feature extraction for hyperspectral face recognition", IET Biom., 2018, vol. 7 Iss. 1, pp. 49-55. (Year: 2017).*

"European Application Serial No. 21198244.2, Response filed Nov. 18, 2022 to Extended European Search Report dated Mar. 23, 2022", 20 pgs.

"European Application Serial No. 21198244.2, Extended European Search Report dated Mar. 23, 2022", 7 pgs.

Jahanbin, Sina, "Three Dimensional Face Recognition using Wavelet Decomposition of Range Images", Image Processing, 2006 IEEE International Conference on, (Sep. 30, 2007), 1-145.

Qin, Bosheng, "Identifying Facemask-Wearing Condition Using Image Super-Resolution with Classification Network to Prevent COVID-19", Sensors, vol. 20, No. 18, (Sep. 14, 2020), 5236.

"Personalized Face Mask Soft Polyester Fave Covering with Your Face Design.", [Online]. Retrieved from the Internet: URL: https://www.etsy.com listing 839740981 personalised-face-mask-soft-polyester, (Accessed on Jan. 31, 2022), 10 pgs.

Anscombe, Tony, "What the ban on facial recognition tech will- and will not—do", welivesecurity.com, (May 20, 2019), 6 pgs.

Keusch, G T, "Drivers of Zoonotic Diseases", National Research Council Committee on Achieving Sustainable Global Capacity for Surveillance and Response to Emerging Diseases of Zoonotic Origin: National Academies Press, (2009), 32 pgs.

Kulkarni, Amey, "Implementing a Real-time, AI-Based, Face Mask Detector Application for COVID-19", Developer Blog, (Aug. 17, 2020), 4 pgs.

Sung, Thai Leang, "Depth edge detection using edge-preserving filter and morphological operations", International Journal of System Assurance Engineering and Management vol. 11, (2020), pp. 812-817.

"European Application Serial No. 21198244.2, Communication Pursuant to Article 94(3) EPC mailed Mar. 1, 2024", 8 pgs.

* cited by examiner

SYSTEMS AND METHODS FOR PRIVACY-PRESERVING FACEMASK-COMPLIANCE-LEVEL MEASUREMENT

TECHNICAL FIELD

Embodiments of the present disclosure relate to processing three-dimensional (3D) depth images, privacy protection, public health, public safety, and, more particularly, to implementing systems and methods for privacy-preserving facemask-compliance-level measurement.

BACKGROUND

As the population of human beings on Earth continues to grow, the overall footprint of humankind on this planet continues to grow as well. As populations of people and animals live in greater and greater proximity, and often share the same land to at least some extent, animal-borne infections of people tend to become more common. In extreme cases, an epidemic or even a pandemic can result from situations such as this, although epidemics and pandemics can arise for other reasons as well.

Among the public health and safety measures that appear to be effective in slowing the spread of an airborne, respiratory virus such as COVID-19 is the wearing of facemasks (including other face coverings, etc.) by people, especially in contexts in which they cannot or do not social distance from one another. Indeed, facemasks have become an extremely common example of personal protective equipment (PPE) worn by people when venturing out in public.

People, however, sometimes forget to wear masks, and sometimes choose not to. Thus, the level of facemask-wearing compliance can vary from situation to situation, including at transportation hubs such as train stations and bus stations, as well as in transportation vehicles such as train cars and buses. It is often the case that public confidence in using such forms of transportation and in venturing out in general is impacted by compliance levels with respect to the wearing of facemasks, as is the overall safety and health of the public, the vibrancy of the economy, and many other aspects of life.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
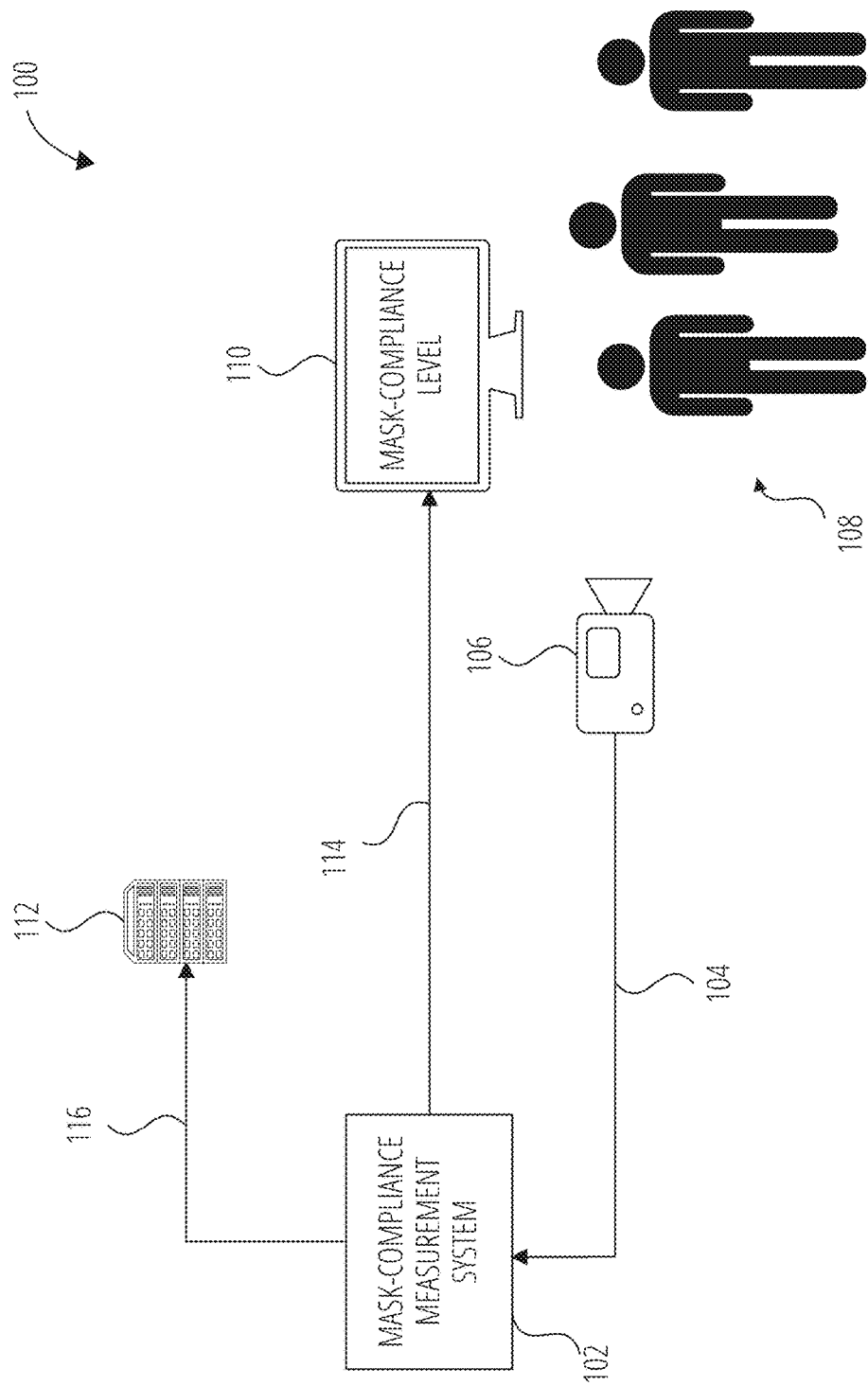
FIG. 1 illustrates an example communication context including an example mask-compliance measurement system, in accordance with at least one embodiment.

Among other inspirations and motivations, embodiments of the present disclosure arose in part from the realization and recognition that, while it is certainly important to be able to measure a level of facemask-wearing compliance in many different contexts including public and private transportation hubs and vehicles, protecting the privacy and identity of the people involved is very important as well. As such, among other advantages, embodiments of the present disclosure are not aimed at identifying and/or reporting particular people as wearing a mask or not, nor at tracking mask-wearing compliance of any particular person over any particular period of time. Rather, embodiments of the present disclosure measure a degree of mask-wearing compliance by one or more people in ways that are robustly anonymized and that are also computationally and energy efficient.

Many prior implementations rely on analysis of visible-light images (e.g., red-green-blue (RGB) images) to recognize people in a given frame—not necessarily by actual identity but at least as being people, visibly identify surfaces, and segment such images to attempt to determine whether or not a given person is currently wearing a facemask. Among other shortcomings, such prior implementations often do not provide anonymity, and often are unintentionally subject to systemic inaccuracies in the context of, as examples, women, people of color, people of a given ethnicity, and/or the like, sometimes due to limitations with respect to available training data.

One example type of this sort of prior implementation involves the use of a trained convolutional neural network to process color images of individuals to assess whether or not those individuals are wearing masks. This example type of prior implementation often suffers not only from the above-mentioned systemic appearance-based inaccuracies, but also tends to be expensive at least in terms of processing time and power required, often limiting its usefulness in battery-powered implementations, among other shortcomings.

As a general matter, then, among other shortcomings, mask-compliance-measurement implementations that are based on analysis of visible-light images often suffer from privacy-protection limitations, and indeed it is often the case that such systems are not permitted by law in various places due to the potential use of such systems for, as examples, compromising identities, engaging in undesired tracking of individuals, engaging in forms of mass manipulation, and so forth. Moreover, as mentioned, many current implementations are based on deep neural networks that often have significant computational requirements, which often limits the applicability of such implementations in terms of power, space, mobility, and the like.

Many current implementations employ powerful graphics processing units (GPUs) among other computationally expensive resources. Moreover, the use of image datasets to learn a high-dimensional classification function tends to be highly dependent on both the quantity and quality of training data both in terms of variability and annotation accuracy. Many deep neural networks encounter this difficulty, a problem that is only exacerbated in the facemask-compliance context due to the amount of available training data being even more limited than normal.

To address these and other shortcomings of prior implementations, disclosed herein are systems and methods for privacy-preserving facemask-compliance-level measurement. Embodiments of the present disclosure reliably determine the extent to which people in a given context (e.g., users of public and/or other shared transportation systems such as buses, subways, commuter trains, air travel, rideshare services, autonomous rideshare services, etc.) are properly wearing facemasks, for example during a pandemic scenario. Moreover, as mentioned above, embodiments of the present disclosure do so without compromising the privacy and/or identity of individuals. Additionally, embodiments of the present disclosure are customizable to check for the wearing of specific types of masks, and in general operate robustly even given the variability of PPE and/or personal items that people often use to cover their face, wear adjacent to their face (e.g., headphones, hoods, scarves, etc.), and so forth.

In many embodiments of the present disclosure, visible-light images are not used at all to assess whether a given person is or is not wearing a mask at a given moment. In some embodiments, however, visible-light images are initially used in a stereoscopic analysis in order to produce a depth image of at least an upper segment of a person (e.g., head and upper torso). In at least some such embodiments, once used for that purpose, the visible-light images are discarded (e.g., securely deleted). One or more of numerous other modalities of acquiring such depth images are used in various other embodiments, including methods involving time of flight, light detection and ranging (LiDAR), radar, sonar, structured light, speckle light, and/or the like. Any method or modality deemed suitable by those of skill in the relevant arts for obtaining depth images can be used in various different implementations.

In some embodiments, a depth-information-capture device is positioned such that its field of view is likely to include the heads of one or more relatively stationary people. For example, a depth camera could be positioned in the back of a cab, at a bus stop, in a forward position inside a train car or bus, etc. As the term is used herein, a "depth-information-capture device" could be any device arranged to capture depth information, some examples including depth cameras, combined visible-light-and-depth cameras, range-sensing devices, radar devices, sonar devices, LiDAR devices, and the like. Similarly, as used herein, a "depth image" can be any dataset that contains depth information. This includes depth maps, and also includes depth images captured by, e.g., depth cameras, combined visible-light-and-depth cameras, and the like, and also includes datasets, such as point clouds, that include data representative of the 3D points, surface(s), feature(s), etc. of its subject(s), including but not limited to datasets that are collected by devices that some of skill in the art may not typically refer to as depth cameras.

Much of the description of various embodiments of this disclosure is in terms of individual instances of obtaining a depth image of at least an upper segment of a person, cropping that depth image down to a facial region, generating a set of spectral-density values (as a surface descriptor) from the cropped depth image in a manner that intentionally and irretrievably destroys information that could be used to identify a particular individual, filters the generated set of spectral-density values using a precomputed spectral-density reference profile associated with properly wearing a particular type of face covering, optionally augments that filtered set of spectral-density values with one or more contextual indicators, classifies that (optionally augmented) filtered set of spectral-density values using a classifier that has been trained to classify filtered sets of spectral-density values to determine whether or not (or how likely it is that) the particular type of facemask is being worn (e.g., properly worn) in images from which those filtered sets of spectral-density values were derived, and incorporates the result of that classification operation into an ongoing and iterative facemask-compliance data set. So while much of this disclosure relates to description of examples of such single instances, it should be understood that embodiments of the present disclosure contemplate repeatedly performing such operations at frequent intervals, such as four times per second, twice per second, once per second, once every two seconds, and/or the like, and with respect to a single individual or multiple individuals, in some cases from a single depth-information-capture device, in other cases from more than one. Moreover, as described herein, certain heuristics are used in at least some embodiments to make assessments of whether or not a person is wearing a mask based on approaches such as considering a rolling window of previous assessments and/or the like.

Figure 9:
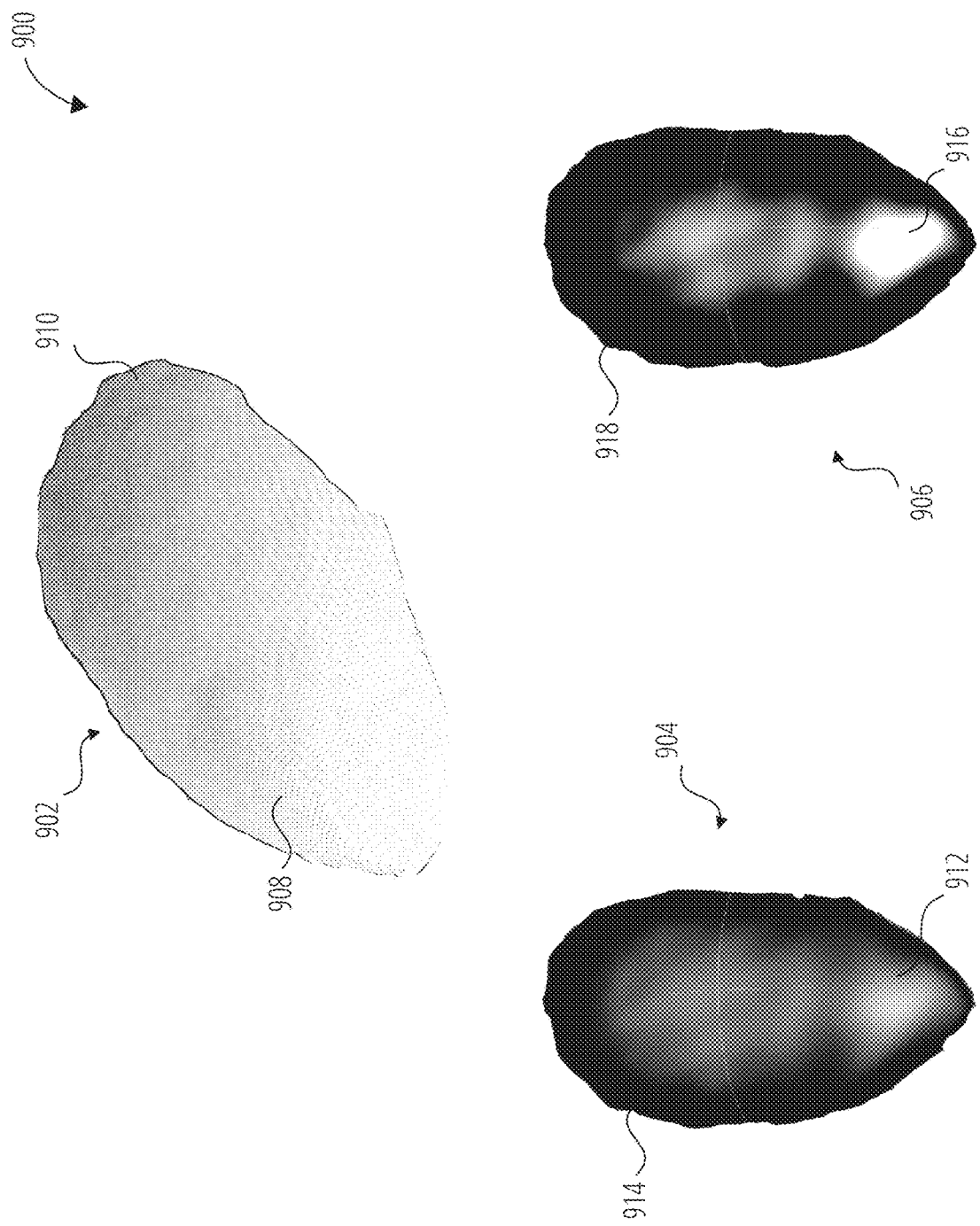
FIG. 9 illustrates an example cropped-face-cap image set, in accordance with at least one embodiment.

In a given instance of obtaining a given depth image that, in this example, includes an upper (e.g., head-and-upper-torso) segment of a person, a mask-compliance measurement system in accordance with at least one embodiment of the present disclosure may remove a background region of the depth image, and may then employ one or more herein-disclosed structural and statistical techniques to identify and crop from the background-less depth image (or equivalently crop the background-less depth image down to) what is referred to herein at times as a "face cap" from the image. These techniques are more fully described below, but result in a face cap that represents, in depth data, approximately the maxillofacial (e.g., frontal face) region of the person, from the forehead region down to the chin region, and wrapping around the head towards the back of the jaw on both sides. (An example face cap 902 is shown in FIG. 9.)

After having obtained the face cap, in at least some embodiments, the mask-compliance measurement system takes a rectangular-grid-shaped sample of the depth values of the face cap. In this disclosure, that grid is described as being of size n-by-m, where n and m are positive integers. And certainly geometric configurations (e.g., circle, triangle, diamond, pseudorandom (but repeatedly used), etc.) other than a rectangular grid could be used in various different embodiments to sample depth values from a depth image of at least a portion of a person's face. Moreover, whether or not the geometric configuration is scaled to the particular face for taking sample depth values, the privacy of the imaged person is protected either way, because the normalization to, e.g., an n-by-m array from any size of face results in loss of information about the size of face from which a given array was produced.

In at least one embodiment, once that (e.g., rectangular) sample is taken, the rest of the face cap is no longer used in making a mask-wearing assessment. And, as stated above, the size of the person's face is no longer retrievable since, in an embodiment, every size face results in an n-by-m array of depth values, protecting privacy in one of a number of ways that embodiments of the present disclosure do. This array of depth values (or smoothed versions thereof) is, in at least one embodiment, transformed (using, e.g., a Fast Fourier Transform (FFT)) from the spatial domain to the frequency domain, each depth value being transformed into a complex number having a real component and an imaginary component.

Such complex numbers in the frequency domain are examples of what are referred to herein as "wavelet descriptors." Furthermore, it is explicitly noted that, while "wavelet descriptor" is used in the present disclosure, that term is also intended to cover wavelet-like descriptors; indeed, in some embodiments, what is referred to in the present disclosure as a "wavelet descriptor" is a wavelet-like descriptor, including at least some embodiments that employ FFT and/or discrete cosine transform (DCT) technology, among other examples.

Thereafter, each such wavelet descriptor may then be processed using an irreversible function such as squaring the coefficients of both components, summing those squares, and taking the square root of the sum. Once this is done and the depth values and wavelet descriptors have been securely deleted, it is not possible to reconstruct the depth map of the individual's face (cap). This is another way in which embodiments of the present disclosure robustly protect privacy. No matter how skilled a hacker might be, they cannot find information that doesn't exist, and they can't reverse an irreversible function. As a simplified example, there is simply no way to know based only on the value of a given real number (e.g., 5) that results from these operations whether that real number was derived from 3+4i, 4−3i, or some other complex number in the frequency domain, and knowing that would be needed to reconstruct the corresponding depth value from that particular frequency-domain value.

The result of the irreversible function in at least one embodiment is an n-by-m array (or vector of length n*m) of real numbers, each of which is a spectral-density value that corresponds to a respective depth value in the original n-by-m sample taken of the face cap. In at least one embodiment, this n-by-m array of real numbers is filtered using a precomputed array of n-by-m real numbers, where the precomputed array was generated using one or more depth images of a person or people properly wearing the type of mask for which the current data (for that time t) is being assessed. This filtering can include an element-wise multiplication (e.g., a Hadamard product) of the two arrays, where the product of the first value in each array becomes the first value in the resulting array, the product of the second value in each array becomes the second value in the resulting array, and so on. It is further noted that, in connection with various embodiments disclosed herein, n-by-m arrays are also referred to at times as u-by-v arrays.

In some embodiments, as discussed more fully below, the array that results from this operation is then arranged into a vector of length n*m, for example by starting with the first row, concatenating the second row at the end of the first row, concatenating the third row at the end of the second row, and so on. In some cases, this vector is augmented by, e.g., having one or more contextual values (reflecting, e.g., type of location, ambient weather, etc.) also included in (e.g., appended to) the vector. In various non-augmented and augmented states, this vector is referred to herein at times as "a set of spectral-density values," "a filtered set of spectral-density values," "a spectral-density surface descriptor," "an augmented spectral-density surface descriptor," "a contextually augmented spectral-density surface descriptor," and other permutations of the like.

Next, in at least one embodiment, that set of spectral-density values (that is referred to herein at times as a "spectral-density surface descriptor") is input into a classification model (of any type deemed suitable by those of skill in the art) that had previously been trained to classify sets of spectral-density values on the basis of whether or not the person in a depth image from which that set of spectral-density values was derived was properly wearing a facemask (e.g., of a particular type). The result of this classification could be a Boolean Yes/No-type indication as to whether the model determines that the associated person was wearing (e.g., properly wearing) a mask of the particular type in the relevant iteration (e.g., at the currently evaluated time t). Such an indication could be based on one or more thresholds as to the likelihood as determined by the classifier that the particular type of mask is being properly worn. The result of the classification could, in addition or instead, be a confidence value and/or a computed likelihood regarding proper wearing of the particular type of mask.

The mask-compliance measurement system may then apply certain heuristics (e.g., a rolling window of a certain number of previous assessments) to determine whether or not to count the person as properly wearing the particular type of mask. The system may then update compliance data that the system may output to a display, another computing device, and/or an output device, which could be an audio output device (that may produce an audible indication of a current mask-compliance level in a given space), among other possible modalities. The system may instead or in addition store the updated compliance data in local data storage. In some cases, the display is viewable by the one or more people whose mask-wearing compliance is being measured. For example, the display could be mounted in a forward portion of the inside of a bus, or in a train station, etc.

As mentioned above, embodiments of the present disclosure involve repeatedly performing operations such as those described herein with respect to a given person or with respect to multiple people. Moreover, in some embodiments, one or more iterations involve assessing whether any of multiple different types of facemasks or other face coverings are being properly worn by one or more people. Such assessments could occur in series or in parallel, in software, firmware, or hardware, and/or in any other manner deemed suitable by those of skill in the relevant art for a given implementation or in a given context.

Thus, one advantageous aspect of embodiments of the present disclosure is the use of robust surface descriptors that reflect robust shape features based on range-sensing (depth) data as opposed to relying on visible-light imagery. Range sensing tends to be advantageous in transportation applications due to the indoors and/or in-cabin distance constraints.

Additionally, as described above and elsewhere herein, embodiments of the present disclosure are advantageous with respect to protecting privacy, identity, and the like for a number of reasons including the above-described one-way mapping (irreversible function) from depth values to spectral-density values. It is not possible to recreate the original depth data or even the intermediate, frequency-domain complex numbers once they have been transformed to the herein-described spectral-density values, and thus it is not possible to regenerate the original face features or even face size from the spectral-density values. As such, the generated descriptors cannot be associated with the person from whom the descriptor was generated. Indeed, in some embodiments, a hardware element (e.g., chip, chiplet, or the like) receives the depth information and outputs the set of spectral-density values such that no personally identifying information ever leaves the hardware element.

Furthermore, due to the harmonic nature of the spectral-density surface descriptor, in at least some cases the information used in making the assertion regarding whether or not a person is properly wearing a particular type of face covering is compressible into a relatively small number of spectral-density coefficients. Those coefficients collectively summarize the attributes that are used to make a given classification. Moreover, embodiments of the present disclosure are easily customizable to be specific to any type of face covering, mask, etc. Once a precomputed spectral-density reference profile has been generated using the herein-described technology and stored for later use, that reference profile can then be implemented as a filter in a given embodiment of the present disclosure. An implementation could check against that reference profile and optionally one or more others as well.

Thus, embodiments of the present disclosure are applicable and highly useful both in contexts (e.g., hospitals) in which a specific type of mask (e.g., an N95 mask) may be standard of care as well as in contexts (e.g., buses) in which any of a number of types of face coverings are considered to be acceptable. Additionally, the current wearing (e.g., proper wearing) of specific types of face coverings can be verified in industrial environments (in order to, for example, enable a given machine or process to be activated), among numerous other examples that could be listed here and that will occur to those of skill in the relevant arts having the benefit of the present disclosure.

Still further advantages of embodiments of the present disclosure pertain to computation workload, integrated cost, and power consumption. The nature of in-cabin, indoor sensing and mobile analytics makes beneficial an approach that is highly responsive within a limited, small computational envelopment. Embodiments of the present disclosure address these aspects by making use of technologies such as chiplets for smart range-sensing cameras, LiDAR, sonar, image-processing software, firmware, and/or hardware blocks that may utilize harmonic (e.g., wavelet, DCT, FFT, etc.) acceleration technology, as well as the herein-described probabilistic classification operations on descriptors produced using one or more such technologies. In general, embodiments of the present disclosure operate effectively in real-world scenarios, provide flexibility with respect to deployment options, promote better use of shared spaces (in, e.g., transportation contexts), and reduce operating costs as compared with prior implementations, all while still enhancing the health and safety of the public.

One embodiment takes the form of a mask-compliance measurement system that includes a processor configured to generate, from an image of a person, a facial depth image of a region of a face of the person. The processor is also configured to generate facial wavelet descriptors from the facial depth image, and to determine spectral-density values of the wavelet descriptors. The processor is further configured to analyze the spectral-density values to generate a mask-wearing-compliance result for the person, where the analyzing includes using a classification model trained to classify sets of spectral-density values with respect to facemask wearing in images from which the spectral-density values were derived.

Yet another embodiment takes the form of one or more non-transitory computer-readable storage media having stored thereon instructions that, when executed by at least one hardware processor, cause the at least one hardware processor to perform operations including generating, from an image of a person, a facial depth image of a region of a face of the person. The operations also include generating facial wavelet descriptors from the facial depth image, and determining spectral-density values of the wavelet descriptors. The operations further include analyzing the spectral-density values to generate a mask-wearing-compliance result for the person, where the analyzing includes using a classification model trained to classify sets of spectral-density values with respect to facemask wearing in images from which the spectral-density values were derived.

Another embodiment takes the form of a system that includes cropping means for generating, from an image of a person, a facial depth image of a region of a face of the person. The system further includes computation means for generating facial wavelet descriptors from the facial depth image, and for determining spectral-density values of the wavelet descriptors. The system also includes classification means for analyzing the spectral-density values to generate a mask-wearing-compliance result for the person, where the analyzing includes using a classification model trained to classify sets of spectral-density values with respect to facemask wearing in images from which the spectral-density values were derived.

Still another embodiment takes the form of a method performed by a computer system executing instructions on a hardware processor, where the method includes generating, from an image of a person, a facial depth image of a region of a face of the person. The method also includes generating facial wavelet descriptors from the facial depth image, and determining spectral-density values of the wavelet descriptors. The method further includes analyzing the spectral-density values to generate a mask-wearing-compliance result for the person, where the analyzing includes using a classification model trained to classify sets of spectral-density values with respect to facemask wearing in images from which the spectral-density values were derived.

As described herein, one or more embodiments of the present disclosure take the form of a method that includes multiple operations. One or more other embodiments take the form of a system that includes at least one hardware processor and that also includes one or more non-transitory computer-readable storage media containing instructions that, when executed by the at least one hardware processor, cause the at least one hardware processor to perform multiple operations (that in some embodiments do and in other embodiments do not correspond to the set of operations performed in a herein-disclosed method embodiment). Still one or more other embodiments take the form of one or more non-transitory computer-readable storage media containing instructions that, when executed by at least one hardware processor, cause the at least one hardware processor to perform multiple operations (that, again, in some embodiments do and in other embodiments do not correspond to the set of operations performed in a herein-disclosed method embodiment and/or the set of operations performed by a herein-disclosed system embodiment).

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment and/or a non-transitory-computer-readable-storage-media embodiment. Furthermore, this flexibility and cross-applicability of embodiments is present in spite of any slightly different language (e.g., processes, process flows, methods, methodologies, steps, operations, functions, and/or the like) that is used to describe and/or characterize such embodiments and/or any element or elements thereof.

In this disclosure, one or more components of one or more devices, systems, and/or the like are referred to as modules that carry out (e.g., perform, execute, and the like) various functions. As used in the present disclosure, a module includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation.

The instructions for a given module are executable by the hardware for carrying out the one or more herein-described functions of the module, and could include hardware (e.g., hardwired) instructions, and could also or instead include firmware instructions, software instructions, and/or the like stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. E2PROM), flash memory, and/or one or more other types of memory) and/or one or more other types of non-transitory computer-readable storage medium. A module could be a single component or be distributed across multiple components.

FIG. 1 illustrates an example communication context 100 that includes an example mask-compliance measurement system 102, in accordance with at least one embodiment. The communication context 100 is provided by way of example and not limitation, as a communication context in connection with a given implementation could have different numbers, types, and/or arrangements of devices, systems, and/or the like. Moreover, while the communication context 100 is described here as pertaining to transportation environments, the present disclosure is not limited in applicability to such environments, as embodiments of the present disclosure could be applied to many different types of situations, contexts, environments, and/or the like.

Moreover, any of the devices, systems, and/or the like that are depicted in FIG. 1 and/or in any of the other figures could have an architecture similar to that described below in connection with the example computer system 1200 of FIG. 12 and could contain and execute software having an architecture similar to that described below in connection with the example software architecture 1302 of FIG. 13. Moreover, any of the communication links depicted in FIG. 1 and/or in any of the other figures could be or include one or more wired-communication links (e.g., Ethernet, fiber optic, Universal Serial Bus (USB), and/or the like) and/or one or more wireless-communication links (e.g., Wi-Fi, LTE, NFC, Bluetooth, Bluetooth Low Energy, and/or the like). Any one or more of the communication links could include one or more intermediate devices such as one or more routers, bridges, servers, access points, base stations, and/or the like. Additionally, any communication link could include one or more VPNs and/or other tunneling-type connections.

As shown by way of example in FIG. 1, the mask-compliance measurement system 102 receives a depth image 104 from a depth-information-capture device 106 over a communication link. In some embodiments, the mask-compliance measurement system 102 includes a depth-information-capture device such as the depth-information-capture device 106, which could be any depth-information-capture device suitable for capturing depth images using any of the depth-sensing technologies mentioned herein and/or any other depth-sensing technology deemed suitable by those of skill in the relevant arts for a given implementation. In at least one embodiment, the depth-information-capture device 106 uses active sensing (e.g., LiDAR) as part of capturing the depth image 104.

In FIG. 1, the depth-information-capture device 106 is depicted as being oriented in the direction of a number of passengers 108 who, in this example, are riding on a bus (not depicted). In at least one embodiment, the depth-information-capture device 106 is positioned and oriented so as to be likely to be able to capture depth images that include people's faces when those faces are relatively stationary (e.g., standing or sitting in a bus). Good results are often obtained with depth-information-capture devices with respect to people's faces when the people are looking directly at the device or turned away from that position by less than about 12 degrees or at least not more than about 45 degrees. Various different embodiments, however, are arranged to function at a variety of such angles.

The mask-compliance measurement system 102 outputs mask-wearing compliance data 114 to a display 110, and also outputs mask-wearing compliance data 116 via a communication link to a computing device 112. The display 110 could be any suitable type of display, and in this example is a light-emitting-diode-(LED)-based display that is mounted in a forward area of the bus in which the passengers 108 are riding. The computing device 112 could be any suitable computing device capable of receiving and, e.g., storing, displaying, and/or the like the received mask-wearing compliance data 116.

Figure 2:
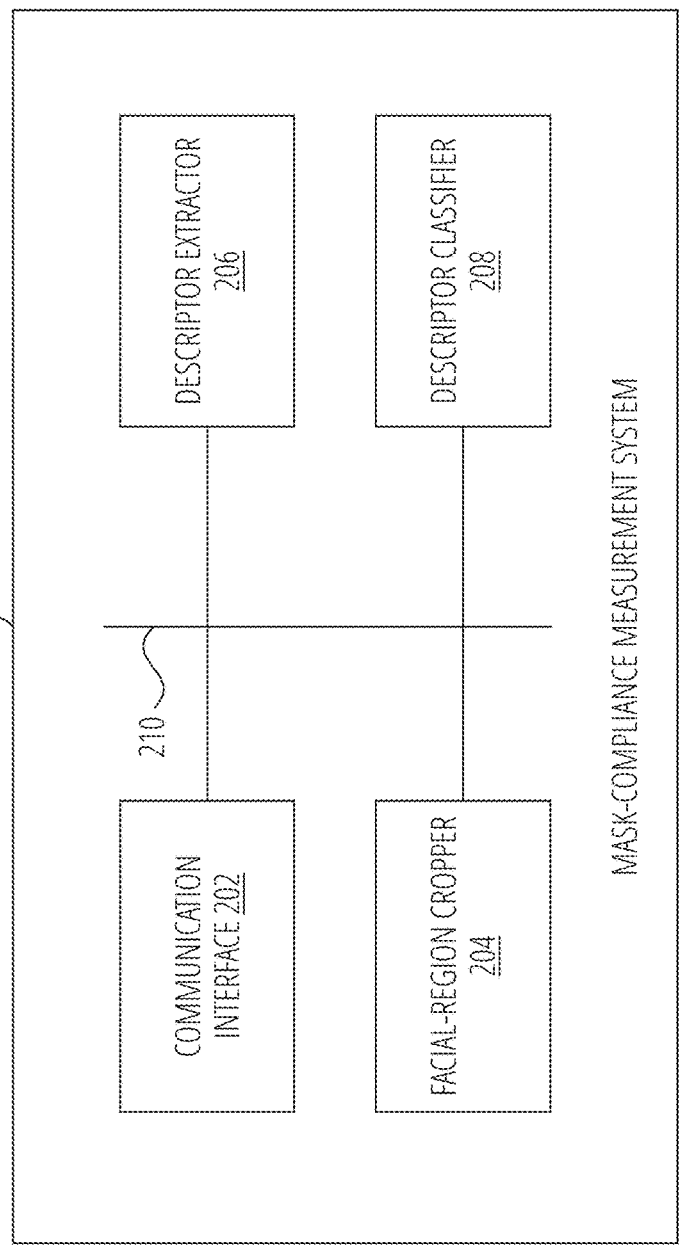
FIG. 2 illustrates an example architecture of the example mask-compliance measurement system of FIG. 1, in accordance with at least one embodiment.

FIG. 2 illustrates an example architecture 200 of the example mask-compliance measurement system 102 of FIG. 1, in accordance with at least one embodiment. The architecture 200 is presented by way of example, as different architectures could be implemented in different contexts. Moreover, one or more of the functions of one or more of the components of the mask-compliance measurement system 102 could be implemented by combining components and/or distributing functions differently among components.

As depicted in FIG. 2, the mask-compliance measurement system 102 includes a communication interface 202, a facial-region-cropping module 204, a descriptor-extraction module 206, and a descriptor-classification module 208, all of which are communicatively interconnected via a system bus 210. Any one or more of these components could be implemented as a standalone hardware component having its own stored instructions and processing hardware. Furthermore, any one or more of these components could be implemented as a code block executed on shared hardware, such as one or more hardware processors (not depicted) of the mask-compliance measurement system 102.

Figure 3:
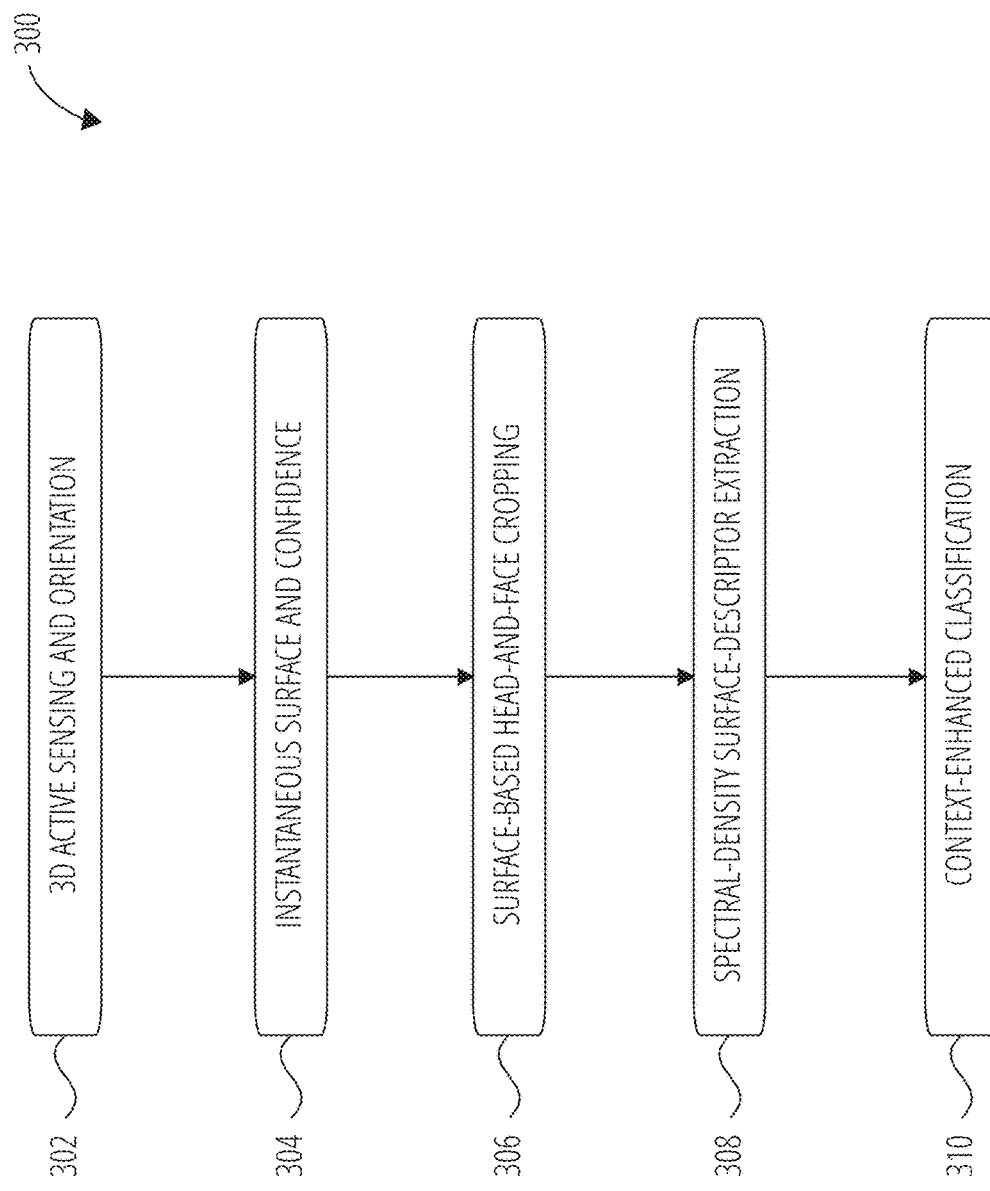
FIG. 3 illustrates an example process flow, in accordance with at least one embodiment.
Figure 4:
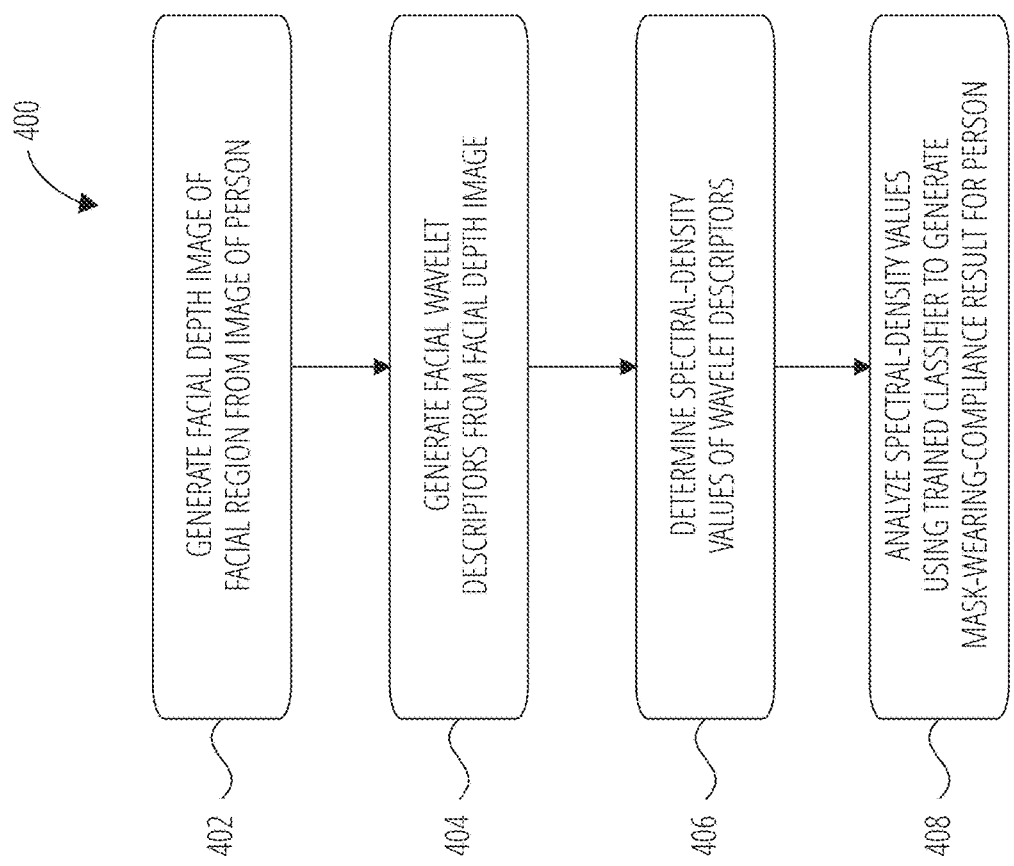
FIG. 4 illustrates an example method, in accordance with at least one embodiment.

Prior to further discussion of the components of the mask-compliance measurement system 102, a process flow 300 of FIG. 3 and a method 400 of FIG. 4 are briefly introduced here. In the discussion below, where applicable, mentions are made of elements of the process flow 300 and operations of the method 400 that correspond to various components of the mask-compliance measurement system 102, so as to avoid the reader encountering standalone redundant explanations of the process flow 300 and/or the method 400. Either or both of the process flow 300 and the method 400 could be performed by the mask-compliance measurement system 102, which is how they are described here for the most part, one exception being that it is the depth-information-capture device 106 that, in this described example, performs at least some of the first element of the process flow 300. That discussion is presented next before returning to the components of the mask-compliance measurement system 102.

The process flow 300 begins with a 3D-active-sensing-and-orientation operation 302, which relates to signal and context acquisition, and which generally involves using active sensing as described above to capture the depth image 104 of the passenger 108. With respect to orientation, the 3D-active-sensing-and-orientation operation 302 may also involve collecting accelerometer and/or gyroscopic information from the depth-information-capture device 106, for example from an inertial measurement unit (IMU) of the depth-information-capture device. This information may convey acceleration resolved into X, Y, and Z components, as is known in the arts. This information is used in at least one embodiment to orient the process of cropping the face cap, which is described more fully below. In particular, this information assists in the identification and orientation of the vertical (Y) axis. The process flow 300 also includes an instantaneous-surface-and-confidence operation 304, a surface-based-head-and-face-cropping operation 306, a spectral-density-surface-descriptor-extraction operation 308, and a context-enhanced classification operation 310, which are discussed below.

The method 400 includes the mask-compliance measurement system 102 generating (at operation 402), from an image of a person, a facial depth image of a region of a face of the person. Furthermore, the mask-compliance measurement system 102 generates (at operation 404) facial wavelet descriptors from the facial depth image, and determines (at operation 406) spectral-density values of the wavelet descriptors. The mask-compliance measurement system 102 analyzes (at operation 408) the spectral-density values to generate a mask-wearing-compliance result for the person, where the analyzing includes using a classification model trained to classify sets of spectral-density values with respect to facemask wearing in images from which the spectral-density values were derived. The mask-compliance measurement system 102 may output mask-wearing-compliance data to at least one of a display, a computing device, and an output device, where the mask-wearing-compliance data reflects the mask-wearing-compliance result determined for the person from the set of spectral-density values.

Figure 5:
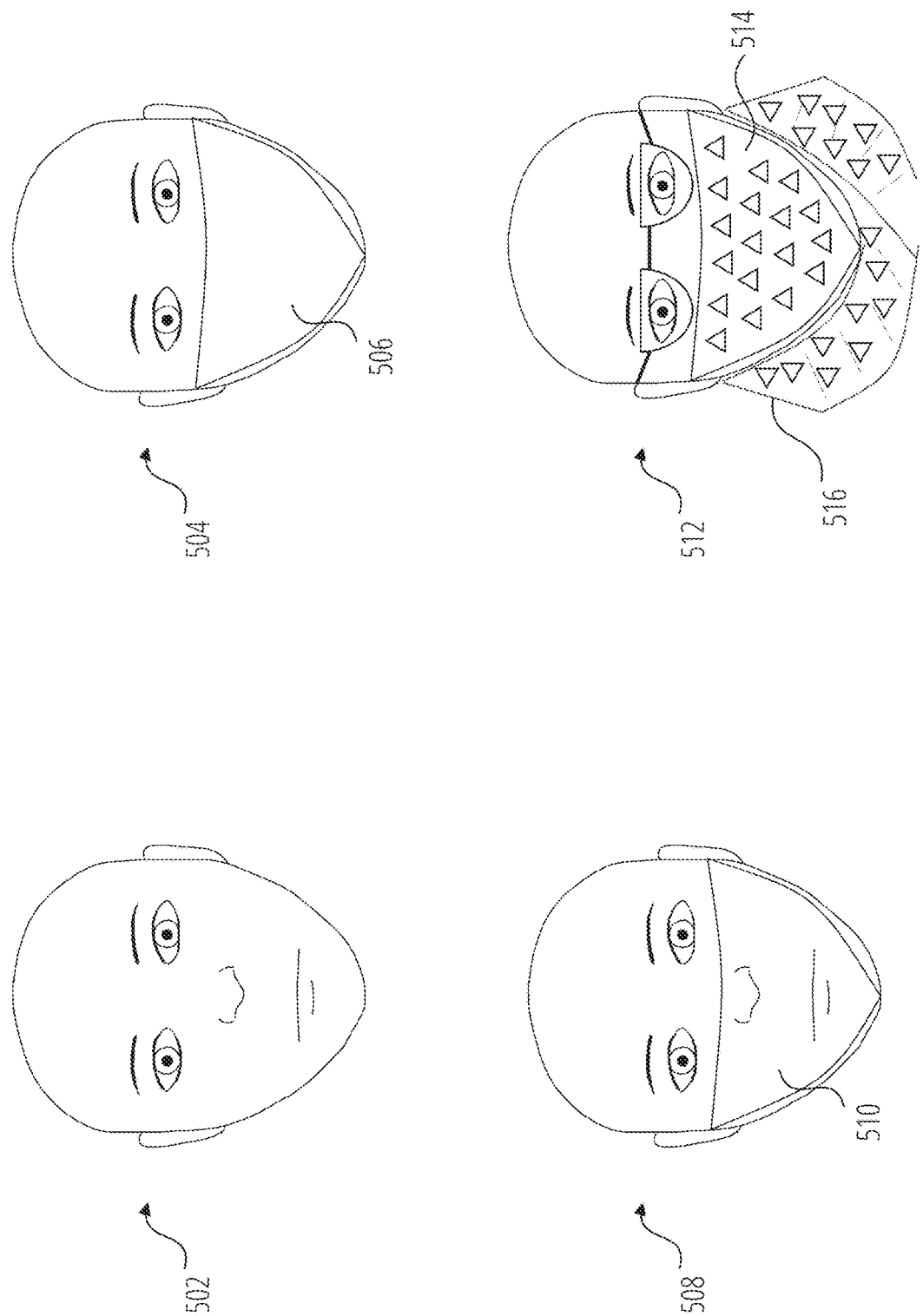
FIG. 5 illustrates an example face without a mask as well as a number of different mask-wearing configurations.

Returning the reader's attention briefly to FIG. 2, the facial-region-cropping module 204 may be configured to generate, from the depth image 104 of a passenger 108, a cropped-face-cap depth image of a facial (e.g., maxillofacial) region of the face of the passenger 108, who could at a given time be in any of a large number of mask-wearing (or non-wearing) configurations, just a few examples of which are shown in FIG. 5. As shown there, a given passenger 108 could have a face 502 that is not presently wearing a mask. As another option, the passenger 108 could have a face 504 on which a mask 506 (e.g., a plain cloth mask) is being worn. As yet another example, the passenger 108 could have a face 508 on which they are wearing a mask 510 on which an image of a lower portion of their own face (or another face) has been printed, a configuration that can prove tricky for implementations that rely on visible-light imaging.

As a final example, of which many more could be offered, the passenger 108 could have a face 512 on which they are wearing eyeglasses, a patterned mask 514, and just below which they are wearing a bulky, similarly patterned scarf 516, another configuration that can prove tricky for implementations that rely on visible-light imaging. Any one or more of the masks that are depicted in FIG. 5 could be of any of numerous types of masks, including cloth masks, surgical masks, other types of medical masks, and/or the like. Numerous other configurations and types of masks could be depicted instead of or in addition to those that are depicted in FIG. 5, as these are provided purely by way of example and not limitation.

Figure 6:
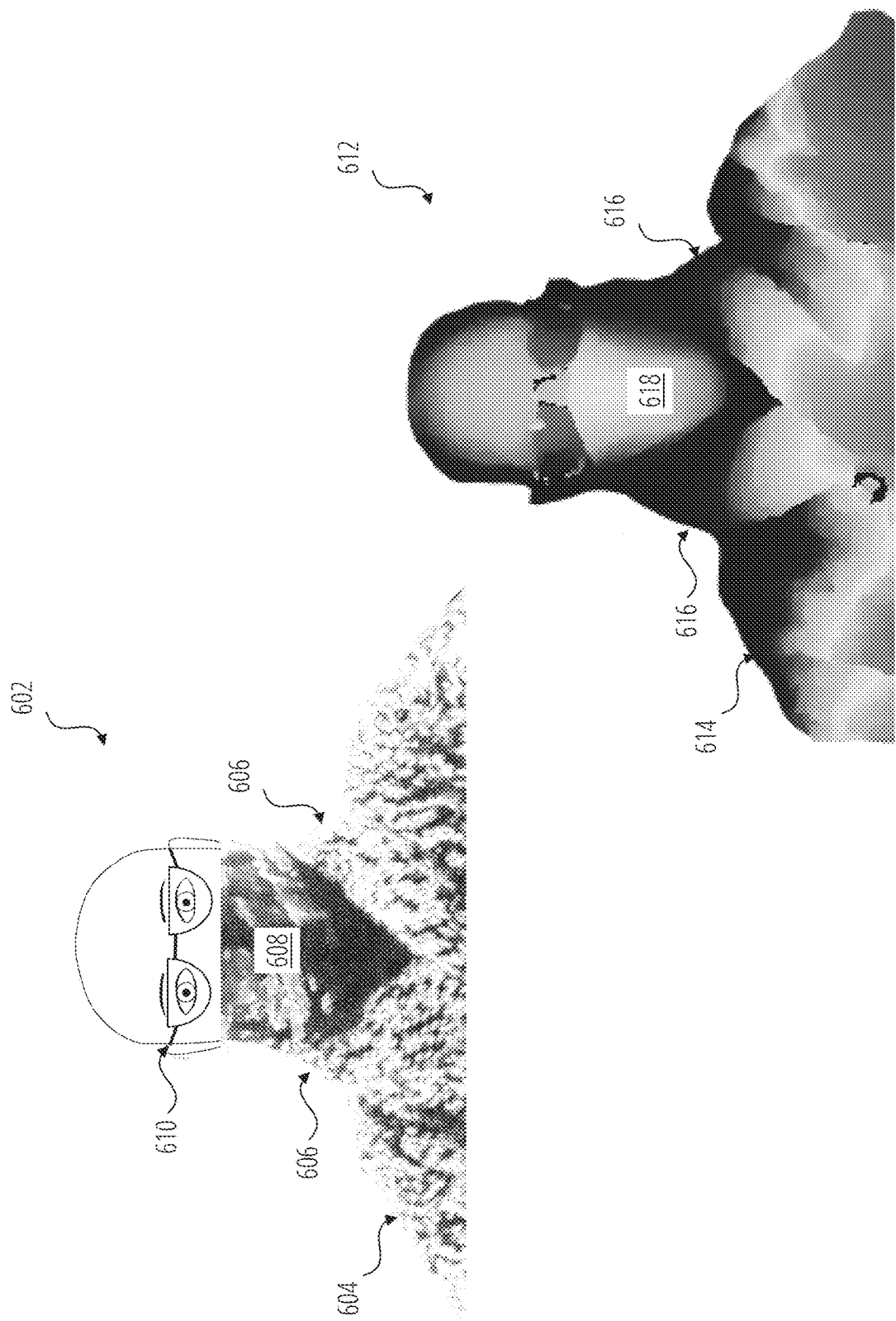
FIG. 6 illustrates both an example color image and an example depth image of a person wearing both a facemask and a sweater.

Following up on the example face 512 in FIG. 5, a similar configuration is depicted in FIG. 6, which shows both an example color image 602 (or another type of visible-light image) and an example depth image 612 of an upper portion of a person that is in such a configuration, which can present a challenge to systems that assess visible-light images of faces to determine whether or not a given person is wearing a mask. As can be seen in the color image 602, the depicted person is wearing eyeglasses 610, a textured and patterned sweater 604 that has a relatively bulky collar 606 that is labeled on both the left and right sides of the person's neck, a dark turtleneck shirt under the sweater 604, as well as a patterned mask 608 over their nose and mouth. It can be seen by inspection that a visible-light-based analysis of the color image 602 may well have trouble distinguishing among the collar 606 of the sweater 604, the turtleneck shirt, and the mask 608.

By way of comparison, also depicted in FIG. 6 is a depth image 612 that corresponds to (e.g., was generated from) the color image 602. As is known in the art, depth images such as the depth image 612 typically depict regions of common depth using common colors—for example, often the smallest depth values, which correspond to objects nearest a depth-information-capture device, are depicted on the blue or "cold" end of the visible-light spectrum, whereas greater depth values, which correspond to objects further from the depth-information-capture device, are depicted on the red or "hot" end of the visible-light spectrum. In the depth image 612 in FIG. 6, the blue end of the spectrum appears as lighter shades whereas the red end of the spectrum appears as darker shades.

As can be seen in the depth image 612, pronounced structure of the collar 606 is visible in a collar region 616 that is labeled on both the left and right sides of the person's neck and that corresponds to the collar 606, as well as in a central and upper portion of a sweater region 614 that corresponds to the sweater 604. Additionally, a facial region 618 is clearly delineated in the depth image 612, where no such delineation is clear in the color image 602. Given that different people have different hair styles, different facial hair, make different clothing choices, wear different eyewear, etc., it can be seen that there are advantages to using depth imaging as opposed to visible-light imaging in systems that automatically assess whether or not a given person is wearing a mask at all, properly wearing a certain type of mask, and/or the like.

Returning the reader's attention again to FIG. 2—in order to generate, from the depth image 104 of the passenger 108, a cropped-face-cap depth image of a facial region of the face of the passenger 108, the facial-region-cropping module 204 may, as discussed, do so based on the depth image 104 without other inputs. In at least one embodiment, however, the facial-region-cropping module 204 makes use of one or more additional, alternative modalities, for example when having access to multimodal sensors. In such embodiments, the facial-region-cropping module 204 may employ one or more other channels of information such as near infrared, reflectance image, and/or the like in order to facilitate the herein-discussed face-cap-cropping operation to, as an example, help to reduce computational workload. The facial-region-cropping module 204 may be considered "cropping means" in the language of the present disclosure, and may include and/or make use of one or more processors (e.g., general processors, image processors, graphics processors, etc.) of the mask-compliance measurement system 102 executing instructions to perform the recited functions, such as those described herein as being performed by the facial-region-cropping module 204.

As a general matter, information derived from one or more additional modalities can be used to inform cropping decisions by providing, for example, additional probability-related calculations to inform various cutting decisions, in some cases on a per-pixel basis, per-voxel basis, per-point basis, per-segment basis, etc., as known in the relevant arts. The use by the facial-region-cropping module 204 of one or more additional, alternative modalities in this manner may correspond to the instantaneous-surface-and-confidence operation 304 of the process flow 300 and to part of the operation 402 of the method 400.

Figure 7:
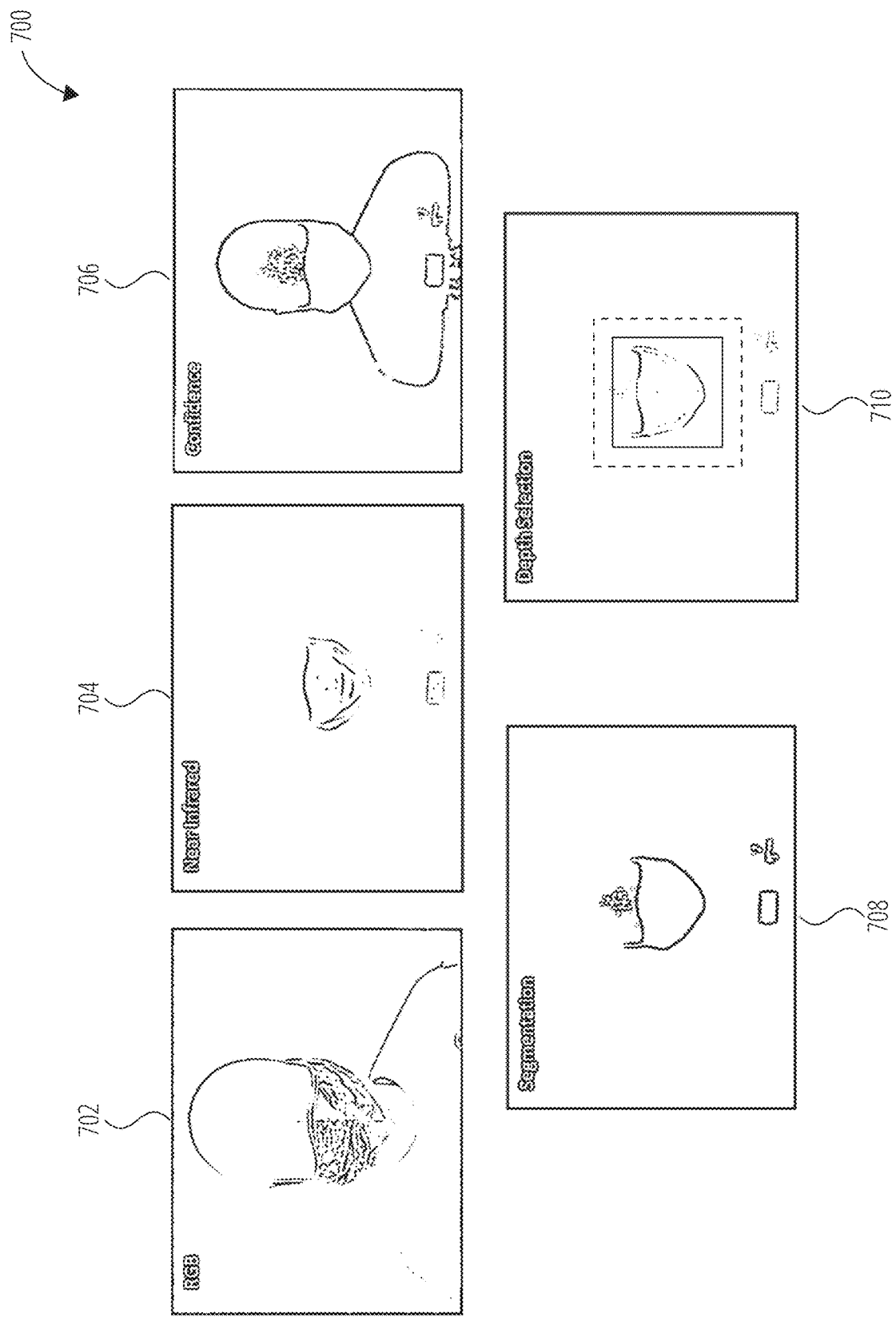
FIG. 7 illustrates an example image set, in accordance with at least one embodiment.

Some representative example images that relate to additional modalities are shown by way of example in FIG. 7, which depicts an example image set 700. It is noted that the first image, an RGB image 702, is included in the image set 700 not because visible-light information is necessarily used in these described embodiments to assist in face-cap cropping, but just to show a graphical representation of an example experimental setup (e.g., a mannequin wearing a mask) used to generate the remaining images in the image set 700. Using that experimental setup, it can be seen that a near-infrared image 704 could be generated and then used, as could a reflectance image in the case of LiDAR instead of near infrared, to compute a (sensing) confidence image 706.

In this described embodiment, the confidence image 706 reflects the quality level of the surface sensing, not to determining whether or not a person (or mannequin) is wearing a mask. The confidence image 706 can be used to produce a segmentation image 708 by way of a segmentation approach such as stringboard and stable thresholding, to segment surface materials such as the mask and a small metallic item positioned on the chest of the mannequin. By using the segmentation image as a selection function over the depth image 104, the facial-region-cropping module 204 may identify regions of interest for later extraction of wavelet descriptors and spectral-density surface descriptors. It is noted that this preprocessing in connection with one or more additional, alternative modalities may be used to improve (e.g., prune) the below-described depth-image-based face-cap-cropping operation.

Whether assisted by one or more additional, alternative modalities or not, the facial-region-cropping module 204 may proceed to generate, from the depth image 104 of the passenger 108, a cropped-face-cap depth image of a facial region of the face of the passenger 108. It is noted that the facial-region-cropping module 204 performing this cropping function may correspond to the surface-based-head-and-face-cropping operation 306 of the process flow 300 and with the operation 402 of the method 400.

Figure 8:
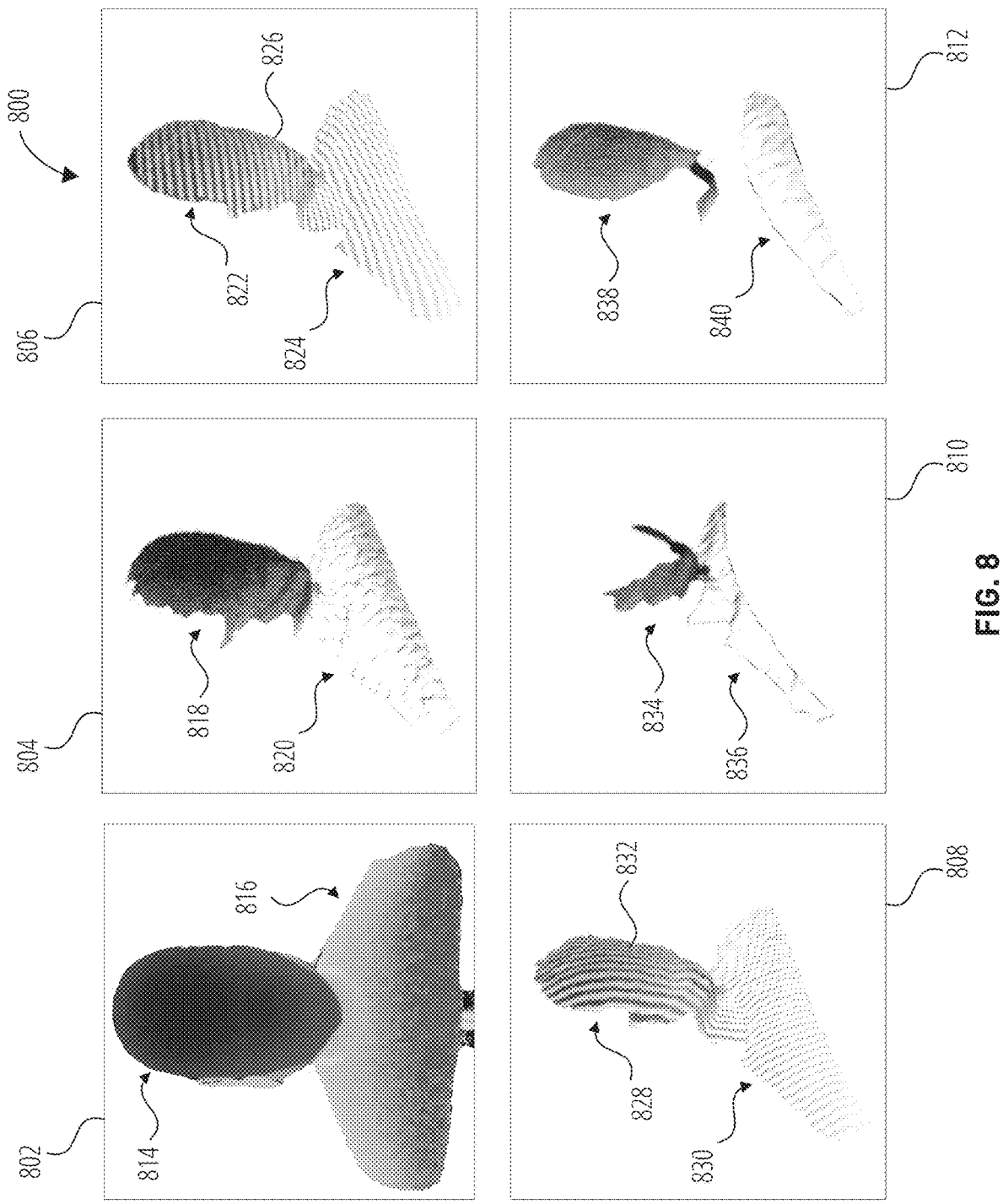
FIG. 8 illustrates an example cropping-image set, in accordance with at least one embodiment.

Some example face-cap-cropping-related images are shown in a cropping-image set 800 that is depicted in FIG. 8. The cropping-image set 800 includes a depth image 802, a background-rejection image 804, an X-strips image 806, a Y-strips image 808, a Z0-strips image 810, and a Z1-strips image 812. The depth image 802 is essentially a starting point for the facial-region-cropping module 204 to use in generating a cropped-face-cap depth image ("cropped face cap") of the passenger 108. Thus, the depth image 802 may correspond to the depth image 104 of FIG. 1. As can be seen in FIG. 8, the depth image 802 includes both a head region 814 and a torso region 816.

The facial-region-cropping module 204 may generate the background-rejection image 804 from the depth image 802 by using background-removal functions known in the art. The background-rejection image 804 includes a head region 818 and a torso region 820, which taken together are referred to herein at times as an upper segment, a front-side face-and-upper-torso segment, etc. One background-rejection technique that may be used is known as octree-subtraction. One main benefit of conducting background removal (a.k.a. background rejection) is to reduce later computational workload by eliminating the processing of unnecessary data. The facial-region-cropping module 204 may also conduct edge-preserving depth smoothing on the background rejection image 804, in order to remove low-amplitude, high-frequency depth noise. Bilateral filtering may use the grid and range distances to preserve the saliency of facial features while removing sensor-specific noise.

Once the background-rejection image 804 has been obtained and smoothed and/or otherwise filtered, the facial-region-cropping module 204 may proceed to working on cropping a region of interest, using a structural and statistical approach to obtain the region of the face to crop from the rest of the head, to facilitate thereafter building a canonical spectral response of the surface, utilizing noise mitigation and gap filling to promote stable and dependable preprocessing. This approach may be referred to herein at times as strip-based facial-region-of-interest extraction. As described below, the facial-region-cropping module 204 may crop the face cap at least in part by treating each of the three dimensions independently prior to doing the actual cropping. Moreover, as described above, the facial-region-cropping module 204 may use IMU data (e.g., accelerometer and/or gyroscope data, etc.) collected by the depth-information-capturing device in order to identify the various axes discussed below, including the axis for the vertical (Y) dimension.

With respect to the horizontal (X) dimension and Y dimension, the facial-region-cropping module 204 may first work to identify a bounding frame of a face portion of the front-side face-and-upper-torso segment of the background-rejection image 804. In connection with the X dimension, this may include delineating the front-side face-and-upper-torso segment into a plurality of horizontal strips, shown as X strips 826 in the X-strips image 806, which also includes a head region 822 and a torso region 824. The X strips 826 may be on the order of 1 millimeter (mm) to 1 centimeter (cm) in width, though any suitable width could be used. Furthermore, the X strips 826 may include every other possible horizontal strip, such that each X strip 826 may be a strip width away from each of its neighboring X strips 826. A similar arrangement may be used with the below-described Y strips 832. Other widths and other sets (e.g., all of the strips, every third strip, etc.) could be used instead.

The facial-region-cropping module 204 may identify first and second horizontal boundaries of the bounding frame of the face portion based at least in part on an extent of horizontal symmetry of at least one of the X strips 826. Thus, the facial-region-cropping module 204 may examine each X strip 826 and record the furthest point out from the center on each at which horizontal symmetry is still maintained. A furthest out of these points or an average of these points, among other options, among a plurality of the X strips 826 could be used to set the first and second horizontal boundaries of the bounding frame. It is noted that, in some embodiments, a contour of each X strip 826 is what is examined, each contour essentially being a projection of the respective X strip 826 onto the xz plane.

In connection with the Y dimension, the facial-region-cropping module 204 may delineate the front-side face-and-upper-torso segment into a plurality of vertical strips, shown as the Y strips 832 in the Y-strips image 808, which also includes a head region 828 and a torso region 830. The Y strips 832 may be similar in structure and arrangement to the X strips 826, other than the relatively orthogonal orientation of course.

Moreover, the facial-region-cropping module 204 may identify first and second vertical boundaries of the bounding frame of the face portion based at least in part on an identification of a plurality of inflection points of at least one of the Y strips 832. Thus, the facial-region-cropping module 204 may examine each Y strip 832 and use a filter to identify and record a location thereon of a first inflection point that corresponds to the forehead of the face and a location thereon of a second inflection point that corresponds to the connection between the chin and the neck. A furthest out of these inflection points or an average of these inflection points, among other options, among a plurality of the Y strips 832 could be used to set the first and second vertical boundaries of the bounding frame. It is noted that, in some embodiments, a contour of each Y strip 832 is what is examined, each contour essentially being a projection of the respective Y strip 832 onto the yz plane.

In connection with the depth (Z) dimension, the facial-region-cropping module 204 may delineate the front-side face-and-upper-torso segment within the just-identified horizontal and vertical boundaries of the bounding frame into a plurality of different sets of depth-dimension (Z) strips, which may be wider (having widths of, e.g., on the order of 2-3 cm) than either the X strips 826 or the Y strips 832. The sets of Z strips could be of different widths and/or start at different offsets, so as to increase the likelihood of capturing the entire face cap. In this described example, two sets of Z strips are used, referred to here as Z0 strips and Z1 strips. Any number of sets of Z strips could be used in a given implementation, such as between 2 and 5 sets, inclusive. Other numbers of sets of Z strips could be used as well, however.

Each set of Z strips may include a different subset of points of the face portion. It can be seen in the Z0-strips image 810, which includes a (partial) head region 834 and a (partial) torso region 836, and in the Z1-strips image 812, which includes a (partial) head region 838 and a (partial) torso region 840, that the different sets of Z strips Z0 and Z captured essentially mutually exclusive subsets of points, where the two subsets could be pieced together to essentially reform the whole front-side head-and-torso region as it appears in the background rejection image 804.

For each of the sets of Z strips, the facial-region-cropping module 204 may identify an ellipsoid that contains the corresponding subset of points of the face portion and is within the horizontal and vertical boundaries of the bounding frame of the face portion. Additionally, the facial-region-cropping module 204 may then identify a largest one of these ellipsoids by volume, and may set the first and second depth-dimension boundaries of a bounding box of the face portion equal or close to (e.g., based on) proximal and distal endpoints of that ellipsoid in the Z dimension. In at least one embodiment, the horizontal and vertical boundaries of the bounding box are those of the aforementioned bounding frame. In some embodiments, the horizontal and vertical boundaries of the bounding box are selected based on those of the bounding frame. Other approaches could be used.

Once the bounding box has been identified, the facial-region-cropping module 204 may use the identified horizontal, vertical, and depth-dimension boundaries of the bounding box to crop the front-side face-and-upper-torso segment of the depth image down to a cropped-face-cap depth image (cropped face cap) of the facial region of the face. An example face cap 902 is shown in FIG. 9 among a cropped-face-cap image set 900, which also includes a first-spectral-band face cap 904 and a second-spectral-band face cap 906. The face cap 902 has a lower region 908 and an upper region 910; the first-spectral-band face cap 904 has a lower region 912 and an upper region 914; and the second-spectral-band face cap 906 has a lower region 916 and an upper region 918. In each case, the respective upper region corresponds to where the eyes and forehead of the person would be, while the respective lower region corresponds to where the nose, mouth, chin, and possibly mask would be. The first-spectral-band face cap 904 and the second-spectral-band face cap 906 may respectively correspond to face-cap surface information in two different spectral bands, yielding different displays of surface features, as shown by way of example in FIG. 9.

Returning again to FIG. 2, the descriptor-extraction module 206 may be configured to generate a spectral-density-surface descriptor that includes spectral-density values that each correspond to a depth value from a sample of depth values from the face cap 902. The functions described herein in connection with the descriptor-extraction module 206 may correspond to the spectral-density-surface-descriptor-extraction operation 308 of the process flow 300 and to the operations 404 and 406 of the method 400.

The descriptor-extraction module 206 may corresponds to "computation means" as that term is used herein, and may correspond to instructions to perform the recited functions being executed on one or more processors of the mask-compliance measurement system 102, an arithmetic logic unit (ALU), a floating point unit (FLU), and/or the like. There, the "recited functions" could be or include those described herein as being performed by the descriptor-extraction module 206. As discussed herein, in at least one embodiment, the content of a spectral-density-surface descriptor in accordance with embodiments of the present disclosure reflects the nature of the related surface but not the size, enhancing the protection of the privacy of those involved.

It is further noted that, in some embodiments, the mask-compliance measurement system 102 includes a depth-information-capture device such as the depth-informationcapture device 106, which itself in some embodiments includes the facial-region-cropping module 204, and in some such embodiments further includes the descriptor-extraction module 206. In some embodiments, a hardware element (e.g., a chip, a chiplet, an ASIC, a depth-information-capture device, etc.) in the mask-compliance measurement system 102 performs the functions that are described herein as being performed by the facial-region-cropping module 204 and the functions that are described herein as being performed by the descriptor-extraction module 206. In such embodiments, such a hardware element may be considered a computation means. In some such embodiments, the hardware element receives depth data and outputs anonymized spectral-density data in accordance with embodiments of the present disclosure.

Once the face cap 902 has been generated, in at least one embodiment, the descriptor-extraction module 206 takes a sample of the depth values in the face cap 902, where, in these described example embodiments, the sample takes the form of an n-by-m array of depth values, n and m being positive integers. Certainly other formations and/or arrangements etc. of samples could be taken, in hexagonal patterns, circular patterns, etc. In at least one embodiment, an n-by-m sample is taken regardless of the size of the face, making the resulting descriptors size-invariant. If there are more than n*m points available, a sub-sample may be taken. If there are less than n*m points available, interpolation may be used to arrive at a full set of n*m values.

In at least one embodiment, after the n-by-m sample of depth values from the face cap 902 has been taken, the descriptor-extraction module 206 uses those values to generate a spectral-density surface descriptor that includes a set of spectral-density values that each correspond to a depth value from the n-by-m sample. The descriptor-extraction module 206 may generate this descriptor at least in part by transforming the depth values in the sample into an n-by-m set of corresponding frequency-domain values (e.g., wavelet descriptors), which may be complex numbers having both a real part and an imaginary part.

The descriptor-extraction module 206 may convert those corresponding wavelet descriptors into an n-by-m set of corresponding spectral-density values, in some cases using an irreversible function to do so. One example of an irreversible function is taking the square root of the sum of the squares (of, e.g., the coefficients) of both the real part and the imaginary part of the associated complex number, resulting in a desired loss of personally identifying information, since, as explained above, the particulars of neither the frequency-domain values nor the depth values can be recovered from the resulting spectral-density values.

Following the conversion to spectral-density values, the descriptor-extraction module 206 may generate a filtered n-by-m set of corresponding spectral-density values at least in part by taking the set of spectral-density values produced from the frequency-domain values, and filtering those values using a precomputed facemask spectral-density reference profile. The descriptor-extraction module 206 may then include the filtered n-by-m set of spectral-density values in the spectral-density surface descriptor. In some instances, the filtering involves performing an element-wise multiplication (e.g., a Hadamard product) of (i) the n-by-m set of spectral-density values produced from the frequency-domain values and (ii) the reference sample-size (n-by-m) set of spectral-density values from the precomputed facemask spectral-density reference profile. The resulting n-by-m array may be arranged (by, e.g., row-wise concatenation) into a vector of length n*m.

Figure 10:
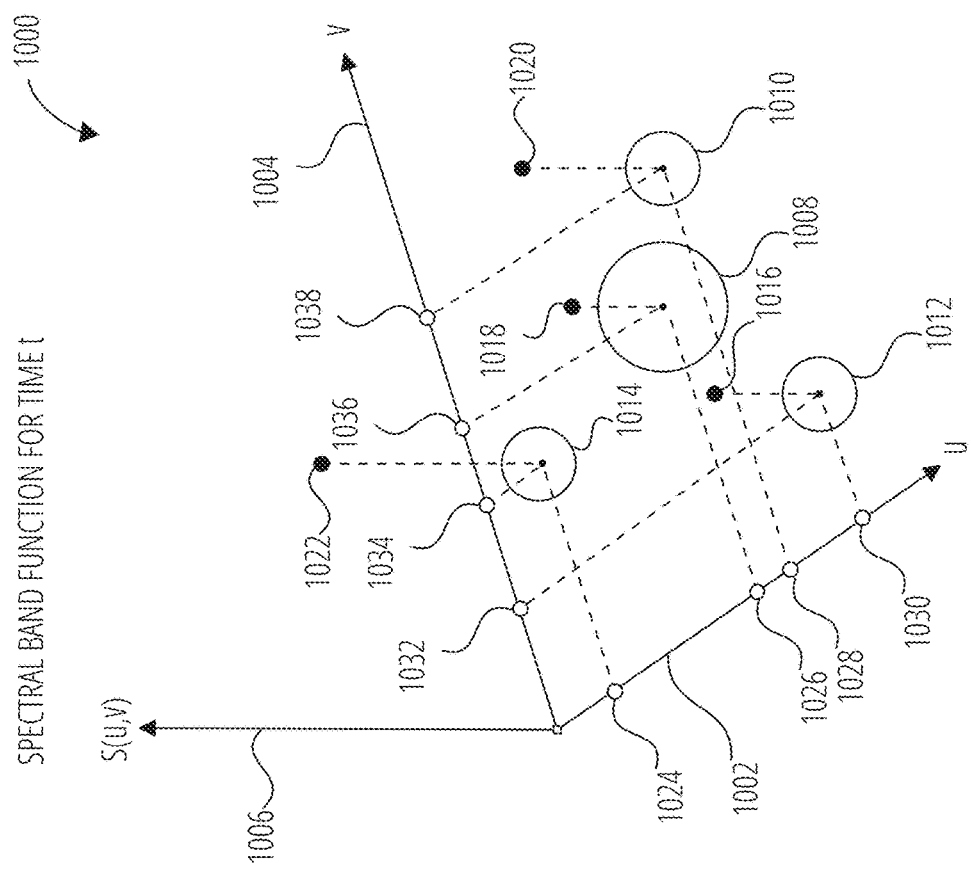
FIG. 10 illustrates an example graph of an example sensor-based spectral band function, in accordance with at least one embodiment.

FIG. 10 shows an example graph of a spectral band function 1000. In an example, the spectral band function 1000 reflects the array of spectral-density values produced by the descriptor-extraction module 206 based on the depth image from a current time t. The spectral band function 1000 describes the harmonic magnitudes of the components constituting the surface structure of the face cap 902. The spectral density function may be represented by an expression such as:

$$S_t(u,v)$$

where t represents the current time period being evaluated.

As can be seen in FIG. 10, the graph of the spectral band function 1000 includes a u axis 1002, a v axis 1004, and an S(u, v) axis 1006. (The S(u, v) axis 1006 corresponds to the above-listed expression, just without the subscript t appearing in FIG. 10.) Furthermore, the graph includes a spectral band 1008, a spectral band 1010, a spectral band 1012, and a spectral band 1014. The spectral band 1008 has a center point defined by a u value 1026 and a v value 1036, and also has a peak corresponding to an S(u, v) value 1018. The spectral band 1010 has a center point corresponding to a u value 1028 and a v value 1038, and also has a peak corresponding to an S(u, v) value 1020.

Additionally, the spectral band 1012 has a center point that corresponds to a u value 1030 and a v value 1032, as well as a peak that corresponds to an S(u, v) value 1016. Lastly, the spectral band 1014 has a center point that corresponds to a u value 1024 and a v value 1034, as well as a peak that corresponds to an S(u, v) value 1022. The uv plane would typically be full of data points, though for clarity, those are not depicted in FIG. 10. Additionally, instead of a single peak, each frequency band may have a series of elevations resembling a small hill or mountain. As mentioned above, the dimensions n and m are expressed at times herein as u and v.

Figure 11:
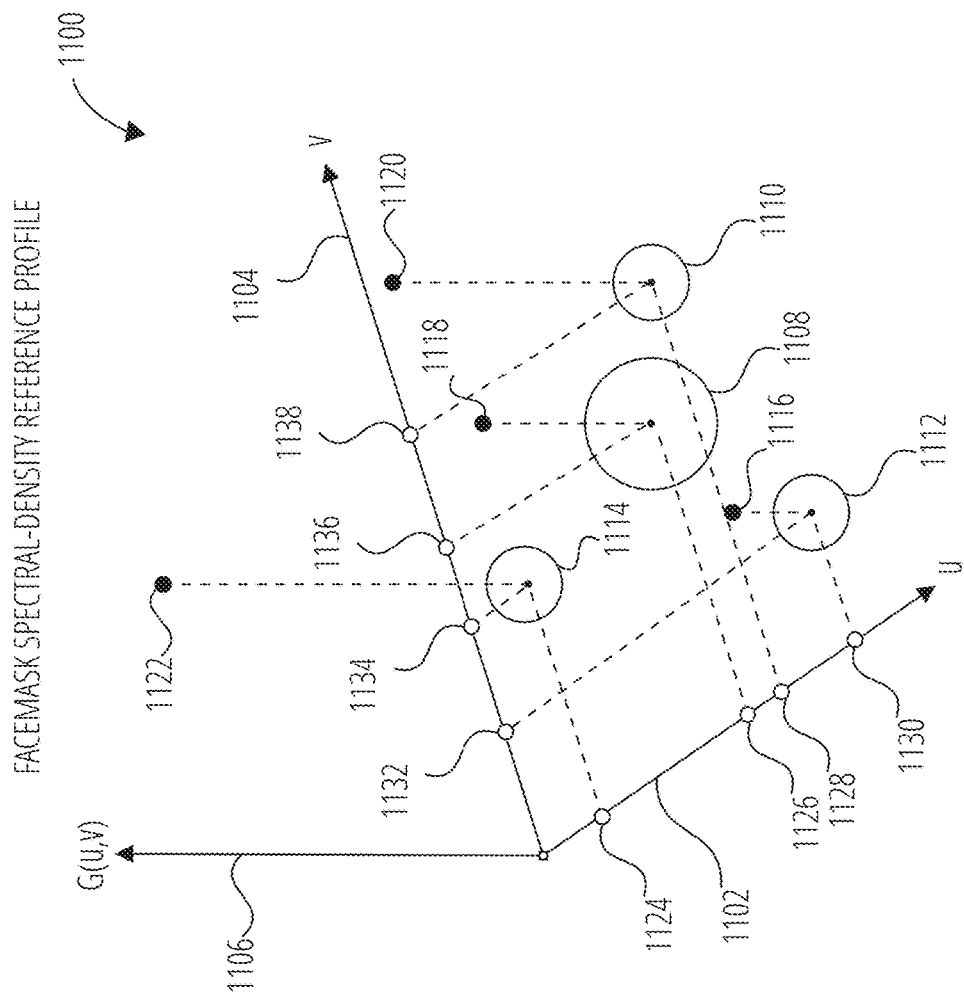
FIG. 11 illustrates an example graph of an example facemask spectral-density reference profile, in accordance with at least one embodiment.

An example graph of an example facemask spectral-density reference profile 1100 is depicted in FIG. 11. The graph includes a u axis 1102, a v axis 1104, and a G(u, v) axis 1106. The example facemask spectral-density reference profile 1100 may be represented by the following expression:

$$G_k(u,v)$$

where k represents the particular spectral-density reference profile shown. (The G(u, v) axis 1106 of FIG. 11 corresponds to the above-listed expression, just without the subscript k appearing in FIG. 11.) Note that by using diverse $k \in \{1, \ldots, w\}$ facial weighting functions $G_k(u, v)$, it is possible to determine whether a user is wearing a specific mask type. Also, by evaluating against all known profiles, it may be able to be determined (or at least determined to a given degree of satisfaction or confidence) whether a user is wearing a mask at all.

In an embodiment, the facemask spectral-density reference profile 1100 was precomputed based on users properly wearing a particular kind of mask that is being checked for in the current example. The facemask spectral-density reference profile 1100 highlights four spectral bands that correspond to the four spectral bands described in connection with FIG. 10. The facemask spectral-density reference profile 1100 includes a spectral band 1108 having a center point that corresponds to a u value 1126 and a v value 1136, as well as a peak at a G(u, v) value 1118. A spectral band 1110 corresponds to a u value 1128 and a v value 1138, and has a peak corresponding to a G(u, v) value 1120. Next, a spectral band 1112 has a center point corresponding to a u value 1130 and a v value 1132, as well as a peak at a G(u, v) value 1116. Lastly, a spectral band 1114 has a center point corresponding to a u value 1124 and a v value 1134, and has a peak corresponding to a G(u, v) value 1122. A given G(u, v) function can represent any type of face covering, such as generic masks, N95 masks, etc.

When an element-wise multiplication is performed between the spectral band function 1000 and the facemask spectral-density reference profile 1100, a resulting function may be referred to as a filtered spectral response, and can be represented by the following equation:

$$H_t(u,v,k) = S_t(u,v) * G_k(u,v)$$

This function is a result of scaling $S_t(u, v)$ up along the profile of $G_k(u, v)$ associated with the facemask spectral-density reference profile 1100, to aid in the classification of the result. Based on this function, a row-wise concatenation produces a feature vector $\psi_t^k \in R^{nm}$.

In some implementations, in addition to the results of the element-wise multiplication, the descriptor-extraction module 206 includes one or more contextual values in the spectral-density surface descriptor by, for example, appending the one or more contextual values on to the above-mentioned vector of length n*m. The contextual values may reflect contextual conditions such as type and/or location of installation of the mask-compliance-measurement system 102, ambient weather, and/or one or more other contextual conditions. The descriptor-extraction module 206 may access a data store of current contextual conditions and may reference a predetermined neural embedding to identify a specific vector to append to the descriptor in connection with the presence of a given contextual condition.

From the context of a sensor installation, the mask-compliance measurement system 102 may select a label for the location from a set such as:

$$L := \{Car, Bus, Metro, Stairs, Corridor, etc.\}$$

This information could be obtained from a static deployment Mobility as a Service (MaaS) coordinator system. Furthermore, from a set of environmental conditions, the mask-compliance measurement system 102 may associate the current location with a weather label from a set such as:

$$W = \{\text{"Sunny", "Rainy", "Windy", etc.}\}.$$

This information could be obtained from a real-time contextual MaaS coordinator system. A particular configuration of such an attribute pair (which can be extended to other sets) could be denoted as:

$$Q := \{L_0 \rightarrow Car, W_1 \rightarrow Rainy\}$$

which could be used to produce a neural embedding such as:

$$Q' := \varphi(Q) := [\varphi(L_0 \rightarrow Car) : \varphi(W_1 \rightarrow Rainy)] \in R^v$$

and concatenation into a real value feature vector of dimension v.

Additionally, some embodiments involve stacking (or concatenating) both feature vectors $\psi_t^k \in R^{nm}$ and $\varphi(Q) \in R^v$ to create an input feature vector encompassing structural information ($\psi_t^k$) and classification context ($\varphi(Q)$) (from, e.g., location and weather factors), which may influence the types and positioning of masks that people wear. Adding this contextual information can enhance the herein-described classification operation, helping it to accurately adapt to the space and time in which the system is operating, increasing confidence and flexibility.

The descriptor-classification module 208 may be configured to generate a mask-wearing-compliance result for the spectral-density surface descriptor at least in part by processing the spectral-density surface descriptor using a machine-learning classification model trained to classify sets of spectral-density values (including spectral-density surface descriptors, contextually augmented spectral-density surface descriptors, and the like) with respect to facemask wearing in images from which the sets of spectral-density values were derived. In various different embodiments, any suitable type of classifier could be trained and used. In at least one embodiment, the filtered spectral response $H_t(u, v, k)$ could be processed using a convolutional neural network. In other embodiments, a statistical classifier could be used. Other classifiers could be used as well, such as decision tree, random forest, and/or any others deemed suitable by those of skill in the art for a given implementation.

In at least one embodiment, the classifier produces a binary output (e.g., properly wearing the particular kind of mask or not) along with an associated normalized confidence score. Any of the other possible outputs discussed above could be implemented as well. In at least some embodiments, the herein-described operations performed by the descriptor-classification module 208 correspond to the context-enhanced classification operation 310 of the process flow 300 and with the operation 406 of the method 400. The descriptor-classification module 208 may be considered a "classification means" as that term is used herein, and may include any number of processors executing instructions to perform the recited functions, such as those described herein as being performed by descriptor-classification module 208.

The mask-compliance measurement system 102 may be configured to output, via the communication interface 202, mask-wearing-compliance data to at least one of the display 110, the computing device 112, and an output device (e.g., an audio-output device (not shown)), as described above. Other output options include updating compliance reports, transmitting one or more alerts to one or more endpoints based on a content of the mask-wearing-compliance data, and/or the like. In an embodiment, the mask-wearing-compliance data reflects the mask-wearing-compliance result for the spectral-density surface descriptor from the above-described classifier.

Numerous possible ways in which the mask-wearing-compliance data could reflect the mask-wearing-compliance result from the above-described classifier for the spectral-density surface descriptor (and therefore for the imaged person) are described above. The mask-wearing-compliance data could include one or more of whole numbers, fractions, percentages, graphics, pie charts, etc. of people in and/or not in compliance. As described above, in some embodiments, classification of a given person as properly wearing a particular kind of mask could be used for access control to various resources, activating various industrial machines and/or processes, activating a rideshare vehicle, and/or the like. One or more of the functions of the mask-compliance measurement system 102 via the communication interface 202 correspond in at least one embodiment to the operation 408 of the method 400.

Figure 12:
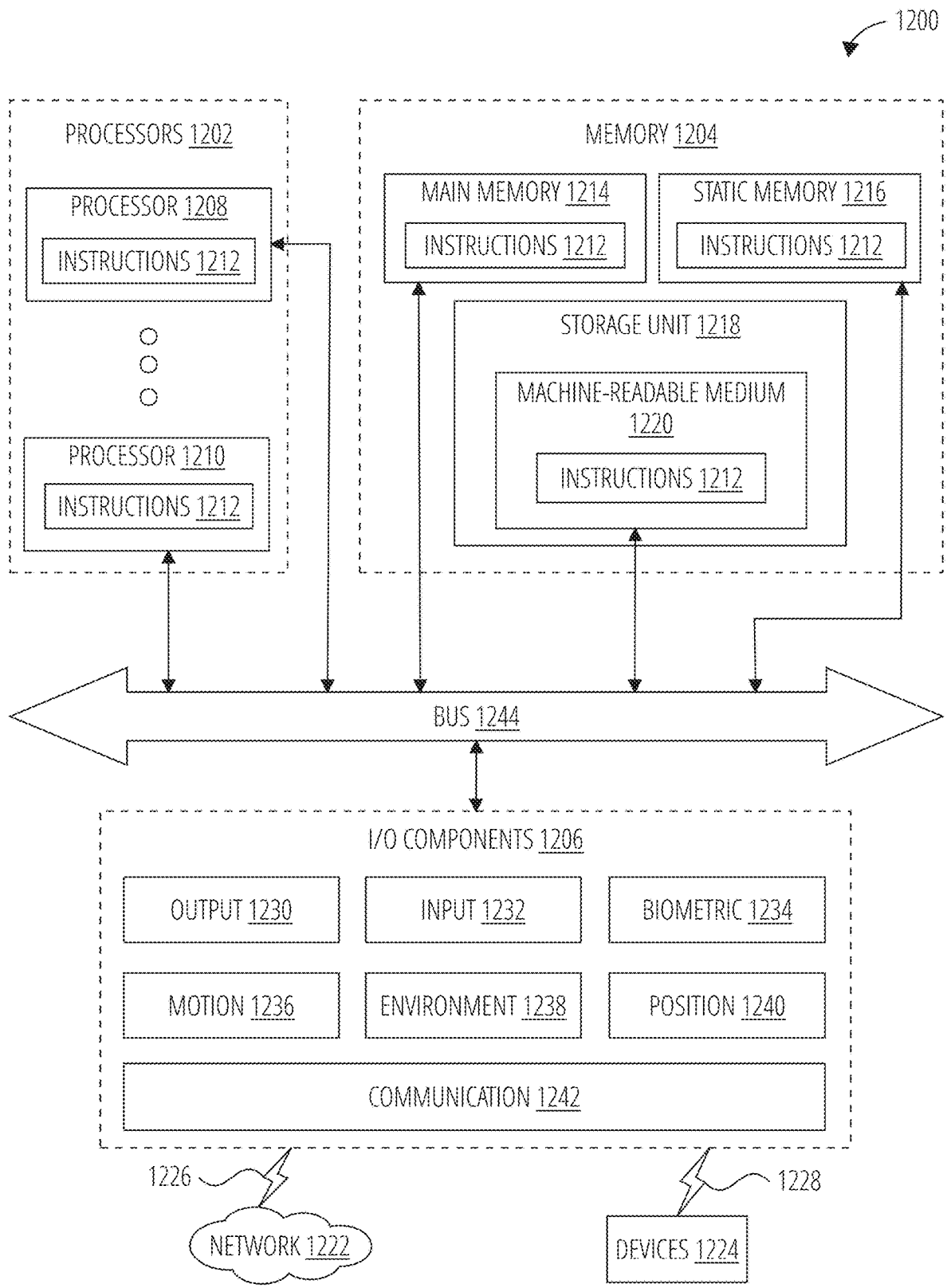
FIG. 12 illustrates an example computer system that may execute a set of instructions to cause the computer system to perform any one or more of the methodologies discussed herein.

FIG. 12 is a diagrammatic representation of a computer system 1200 within which instructions 1212 (e.g., software, a program, an application, an applet, an app, and/or other executable code) for causing the computer system 1200 to perform any one or more of the methodologies discussed herein may be executed. For example, execution of the instructions 1212 may cause the computer system 1200 to perform any one or more of the methods described herein. The instructions 1212 transform the general, non-programmed computer system 1200 into a particular computer system 1200 programmed to carry out the described and illustrated functions in the manner described. The computer system 1200 may operate as a standalone device or may be coupled (e.g., networked) to other machines. In a networked deployment, the computer system 1200 may operate in the capacity of a server machine or a client machine in a server-client network environment, or as a peer machine in a peer-to-peer (or distributed) network environment.

The computer system 1200 may be or include, but is limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, and/or any other machine capable of executing the instructions 1212, sequentially or otherwise, that specify actions to be taken by the computer system 1200. Further, while only a single computer system 1200 is illustrated, the term "machine" shall also be taken to include a collection of machines that individually or jointly execute the instructions 1212 to perform any one or more of the methodologies discussed herein.

The computer system 1200 may include processors 1202, memory 1204, and I/O components 1206, which may be configured to communicate with each other via a bus 1244. In an example embodiment, the processors 1202 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, for example, a processor 1208 and a processor 1210 that execute the instructions 1212. The term "processor" is intended to include multi-core processors that may include two or more independent processors (sometimes referred to as "cores") that may execute instructions contemporaneously. Although FIG. 12 shows multiple processors 1202, the computer system 1200 may include a single processor with a single core, a single processor with multiple cores (e.g., a multi-core processor), multiple processors with a single core, multiple processors with multiples cores, or any combination thereof.

The memory 1204 includes a main memory 1214, a static memory 1216, and a storage unit 1218, each of which is accessible to the processors 1202 via the bus 1244. The memory 1204, the static memory 1216, and/or the storage unit 1218 may store the instructions 1212 executable for performing any one or more of the methodologies or functions described herein. The instructions 1212 may also or instead reside completely or partially within the main memory 1214, within the static memory 1216, within machine-readable medium 1220 within the storage unit 1218, within at least one of the processors 1202 (e.g., within a cache memory of a given one of the processors 1202), and/or any suitable combination thereof, during execution thereof by the computer system 1200. The machine-readable medium 1220 is one or more non-transitory computer-readable storage media.

The I/O components 1206 may include a wide variety of components to receive input, produce and/or provide output, transmit information, exchange information, capture measurements, and/or the like. The specific I/O components 1206 that are included in a particular instance of the computer system 1200 will depend on the type of machine. For example, portable machines such as mobile phones may include a touch input device or other such input mechanisms, while a headless server machine may not include such a touch input device. It will be appreciated that the I/O components 1206 may include many other components that are not shown in FIG. 12.

In various example embodiments, the I/O components 1206 may include output components 1230 and input components 1232. The output components 1230 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth. The input components 1232 may include alphanumeric input components (e.g., a keyboard, a touchscreen configured to receive alphanumeric input, a photo-optical keyboard, and/or other alphanumeric input components), point-based input components (e.g., a mouse, a touchpad, a trackball, a joystick, a motion sensor, and/or one or more other pointing instruments), tactile input components (e.g., a physical button, a touchscreen that is responsive to location and/or force of touches or touch gestures, and/or one or more other tactile input components), audio input components (e.g., a microphone), and/or the like.

In further example embodiments, the I/O components 1206 may include biometric components 1234, motion components 1236, environmental components 1238, and/or position components 1240, among a wide array of other components. The biometric components 1234 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, and/or electroencephalogram-based identification), and/or the like. The motion components 1236 may include acceleration-sensing components (e.g., an accelerometer), gravitation-sensing components, rotation-sensing components (e.g., a gyroscope), etc.

The environmental components 1238 may include, for example, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors that detect nearby objects), gas-sensing components (e.g., gas-detection sensors to detection concentrations of hazardous gases for safety and/or to measure pollutants in the atmosphere), and/or other components that may provide indications, measurements, signals, and/or the like that correspond to a surrounding physical environment. The position components 1240 may include location-sensing components (e.g., a global positioning system (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 1206 may further include communication components 1242 operable to communicatively couple the computer system 1200 to a network 1222 and/or devices 1224 via a coupling 1226 and/or a coupling 1228, respectively. For example, the communication components 1242 may include a network-interface component or another suitable device to interface with the network 1222. In further examples, the communication components 1242 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 1224 may include one or more other machines and/or any of a wide variety of peripheral devices (e.g., a peripheral device coupled via a universal serial bus (USB) connection).

Moreover, the communication components 1242 may detect identifiers or include components operable to detect identifiers. For example, the communication components 1242 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 1242, such as location via Internet Protocol (IP) geolocation, location via Wi-Fi signal triangulation, location via detecting an NFC beacon signal that may indicate a particular location, and/or the like.

One or more of the various memories (e.g., the memory 1204, the main memory 1214, the static memory 1216, and/or the (e.g., cache) memory of one or more of the processors 1202) and/or the storage unit 1218 may store one or more sets of instructions (e.g., software) and/or data structures embodying or used by any one or more of the methodologies or functions described herein. These instructions (e.g., the instructions 1212), when executed by one or more of the processors 1202, cause various operations to implement various embodiments of the present disclosure.

The instructions 1212 may be transmitted or received over the network 1222, using a transmission medium, via a network-interface device (e.g., a network-interface component included in the communication components 1242) and using any one of a number of well-known transfer protocols (e.g., the Session Initiation Protocol (SIP), the hypertext transfer protocol (HTTP), and/or the like). Similarly, the instructions 1212 may be transmitted or received using a transmission medium via the coupling 1228 (e.g., a peer-to-peer coupling) to the devices 1224.

Figure 13:
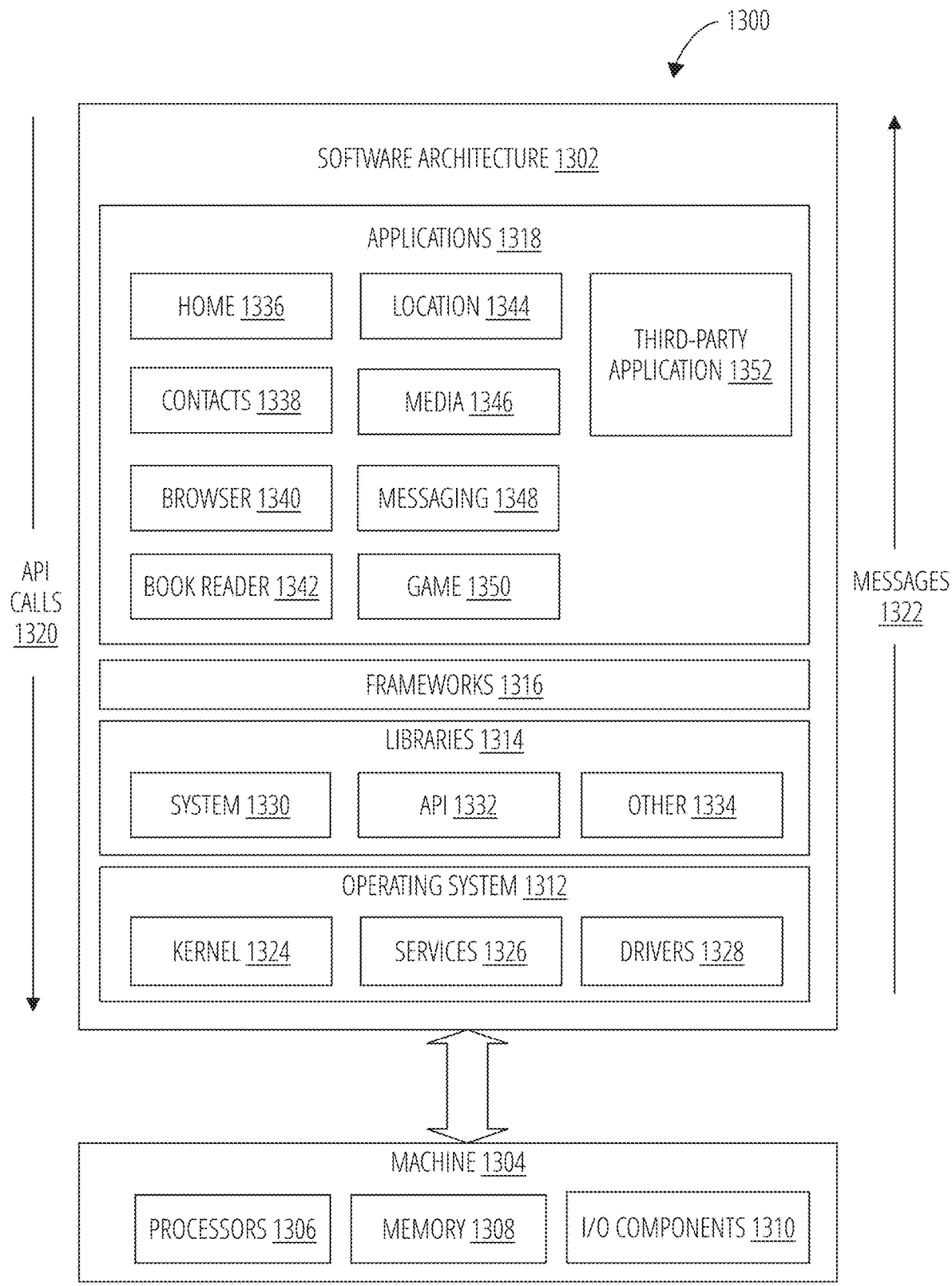
FIG. 13 illustrates an example software architecture in accordance with which one or more embodiments of the present disclosure may be implemented.

FIG. 13 is a block diagram 1300 illustrating a software architecture 1302, which can be installed on any one or more of the devices described herein. For example, the software architecture 1302 could be installed on any device or system that is arranged similar to the computer system 1200 of FIG. 12. The software architecture 1302 is supported by hardware such as a machine 1304 that includes processors 1306, memory 1308, and I/O components 1310. In this example, the software architecture 1302 can be conceptualized as a stack of layers, where each layer provides a particular functionality. The software architecture 1302 includes layers such an operating system 1312, libraries 1314, frameworks 1316, and applications 1318. Operationally, using one or more application programming interfaces (APIs), the applications 1318 invoke API calls 1320 through the software stack and receive messages 1322 in response to the API calls 1320.

The operating system 1312 manages hardware resources and provides common services. The operating system 1312 includes, for example, a kernel 1324, services 1326, and drivers 1328. The kernel 1324 acts as an abstraction layer between the hardware and the other software layers. For example, the kernel 1324 may provide memory management, processor management (e.g., scheduling), component management, networking, and/or security settings, in some cases among other functionality. The services 1326 can provide other common services for the other software layers. The drivers 1328 are responsible for controlling or interfacing with the underlying hardware. For instance, the drivers 1328 can include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 1314 provide a low-level common infrastructure used by the applications 1318. The libraries 1314 can include system libraries 1330 (e.g., a C standard library) that provide functions such as memory-allocation functions, string-manipulation functions, mathematic functions, and/or the like. In addition, the libraries 1314 can include API libraries 1332 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in graphic content on a display), database libraries (e.g., SQLite to provide various relational-database functions), web libraries (e.g., WebKit to provide web-browsing functionality), and/or the like. The libraries 1314 can also include a wide variety of other libraries 1334 to provide many other APIs to the applications 1318.

The frameworks 1316 may provide a high-level common infrastructure that is used by the applications 1318. For example, the frameworks 1316 may provide various graphical user interface (GUI) functions, high-level resource management, high-level location services, and/or the like. The frameworks 1316 can provide a broad spectrum of other APIs that can be used by the applications 1318, some of which may be specific to a particular operating system or platform.

Purely as representative examples, the applications 1318 may include a home application 1336, a contacts application 1338, a browser application 1340, a book-reader application 1342, a location application 1344, a media application 1346, a messaging application 1348, a game application 1350, and/or a broad assortment of other applications generically represented in FIG. 13 as a third-party application 1352. The applications 1318 are programs that execute functions defined in the programs. Various programming languages can be employed to create one or more of the applications 1318, structured in a variety of manners, such as object-oriented programming languages (e.g., Objective-C, Java, C++, etc.), procedural programming languages (e.g., C, assembly language, etc.), and/or the like. In a specific example, the third-party application 1352 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. In this example, the third-party application 1352 can invoke the API calls 1320 provided by the operating system 1312 to facilitate functionality described herein.

In view of the disclosure above, various examples are set forth below. It should be noted that one or more features of an example, taken in isolation or combination, should be considered within the disclosure of this application.

Example 1 is a mask-compliance measurement system including a processor configured to generate, from an image of a person, a facial depth image of a region of a face of the person; generate facial wavelet descriptors from the facial depth image; determine spectral-density values of the wavelet descriptors; and analyze the spectral-density values to generate a mask-wearing-compliance result for the person, the analyzing including using a classification model trained to classify sets of spectral-density values with respect to facemask wearing in images from which the spectral-density values were derived.

Example 2 is the mask-compliance measurement system of Example 1, where the processor is further configured to identify boundaries of a bounding box of a face portion of an upper segment of the depth image; and crop the upper segment of the depth image down to the facial depth image based on the identified boundaries of the bounding box of the face portion.

Example 3 is the mask-compliance measurement system of Example 2, where the processor being configured to identify the boundaries of the bounding box of the face portion includes the processor being configured to delineate the upper segment of the depth image into a plurality of horizontal strips; and identify first and second horizontal boundaries of the bounding box of the face portion based on an extent of horizontal symmetry of at least one of the horizontal strips.

Example 4 is the mask-compliance measurement system of Example 2 or Example 3, where the processor being configured to identify the boundaries of the bounding box of the face portion includes the processor being configured to delineate the upper segment of the depth image of the person into a plurality of vertical strips; and identify first and second vertical boundaries of the bounding box of the face portion based on an identification of a plurality of inflection points of at least one of the vertical strips.

Example 5 is the mask-compliance measurement system of any of the Examples 2-4, where the processor being configured to identify the boundaries of the bounding box of the face portion includes the processor being configured to identify horizontal and vertical boundaries of a bounding frame of the face portion; and identify first and second depth-dimension boundaries of the bounding box of the face portion from within a framed portion of the upper segment of the depth image, the framed portion being that portion that lies within the identified horizontal and vertical boundaries of the bounding frame.

Example 6 is the mask-compliance measurement system of Example 5, where the processor being configured to identify the first and second depth-dimension boundaries of the bounding box of the face portion includes the processor being configured to delineate the framed portion into a plurality of different sets of depth-dimension strips, each of the sets of depth-dimension strips including a different subset of points of the framed portion; identify, for each of the sets of depth-dimension strips, an ellipsoid that contains the corresponding subset of points of the face portion and is within the framed portion; and identify the first and second depth-dimension boundaries of the bounding box of the face portion based on identifying proximal and distal depth extremes of a largest-by-volume one of the plurality of ellipsoids.

Example 7 is the mask-compliance measurement system of any of the Examples 1-6, where the processor being configured to generate the facial wavelet descriptors from the facial depth image includes the processor being configured to transform each depth value in a sample of depth values from the facial depth image into one of the facial wavelet descriptors; and the processor being configured to determine the spectral-density values of the wavelet descriptors includes the processor being configured to convert each of the facial wavelet descriptors into a corresponding spectral-density value.

Example 8 is the mask-compliance measurement system of Example 1 or Example 7, where an irreversible function is used to convert each of the facial wavelet descriptors into a corresponding spectral-density value.

Example 9 is the mask-compliance measurement system of Example 7 or Example 8, where the processor is further configured to generate filtered spectral-density values at least in part by filtering, using a precomputed facemask spectral-density reference profile, the spectral-density values derived from the sample of depth values from the facial depth image; and the processor being configured to analyze the spectral-density values includes the processor being configured to analyze the filtered spectral-density values.

Example 10 is the mask-compliance measurement system of Example 9, where the precomputed facemask spectral-density reference profile includes a same number of reference spectral-density values as there are derived spectral-density values; and the filtering includes an element-wise multiplication of the reference spectral-density values and the derived spectral-density values.

Example 11 is the mask-compliance measurement system of any of the Examples 1-10, where the processor being configured to analyze the spectral-density values includes the processor being configured to analyze the spectral-density values together with one or more contextual values.

Example 12 is the mask-compliance measurement system of Example 11, where the one or more contextual values indicate one or more contextual conditions selected from the group consisting of ambient weather and installation location of the mask-compliance measurement system.

Example 13 is one or more non-transitory computer-readable storage media having stored thereon instructions that, when executed by at least one hardware processor, cause the at least one hardware processor to perform operations including generating, from an image of a person, a facial depth image of a region of a face of the person; generating facial wavelet descriptors from the facial depth image; determining spectral-density values of the wavelet descriptors; and analyzing the spectral-density values to generate a mask-wearing-compliance result for the person, the analyzing including using a classification model trained to classify sets of spectral-density values with respect to facemask wearing in images from which the spectral-density values were derived.

Example 14 is the one or more non-transitory computer-readable storage media of Example 13, the operations further including identifying boundaries of a bounding box of a face portion of an upper segment of the depth image; and cropping the upper segment of the depth image down to the facial depth image based on the identified boundaries of the bounding box of the face portion.

Example 15 is the one or more non-transitory computer-readable storage media of Example 14, where the identifying of the boundaries of the bounding box of the face portion includes delineating the upper segment of the depth image into a plurality of horizontal strips; and identifying first and second horizontal boundaries of the bounding box of the face portion based on an extent of horizontal symmetry of at least one of the horizontal strips.

Example 16 is the one or more non-transitory computer-readable storage media of Example 14 or Example 15, where identifying the boundaries of the bounding box of the face portion includes delineating the upper segment of the depth image of the person into a plurality of vertical strips; and identifying first and second vertical boundaries of the bounding box of the face portion based on an identification of a plurality of inflection points of at least one of the vertical strips.

Example 17 is the one or more non-transitory computer-readable storage media of any of the Examples 14-16, where identifying the boundaries of the bounding box of the face portion includes identifying horizontal and vertical boundaries of a bounding frame of the face portion; and identifying first and second depth-dimension boundaries of the bounding box of the face portion from within a framed portion of the upper segment of the depth image, the framed portion being that portion that lies within the identified horizontal and vertical boundaries of the bounding frame.

Example 18 is the one or more non-transitory computer-readable storage media of Example 17, where identifying the first and second depth-dimension boundaries of the bounding box of the face portion includes delineating the framed portion into a plurality of different sets of depth-dimension strips, each of the sets of depth-dimension strips including a different subset of points of the framed portion; identifying, for each of the sets of depth-dimension strips, an ellipsoid that contains the corresponding subset of points of the face portion and is within the framed portion; and identifying the first and second depth-dimension boundaries of the bounding box of the face portion based on identifying proximal and distal depth extremes of a largest-by-volume one of the plurality of ellipsoids.

Example 19 is the one or more non-transitory computer-readable storage media of any of the Examples 13-19, where generating the facial wavelet descriptors from the facial depth image includes transforming each depth value in a sample of depth values from the facial depth image into one of the facial wavelet descriptors; and determining the spectral-density values of the wavelet descriptors includes converting each of the facial wavelet descriptors into a corresponding spectral-density value.

Example 20 is the one or more non-transitory computer-readable storage media of Example 13 or Example 19, where an irreversible function is used to convert each of the facial wavelet descriptors into a corresponding spectral-density value.

Example 21 is the one or more non-transitory computer-readable storage media of Example 19 or Example 20, the operations further including generating filtered spectral-density values at least in part by filtering, using a precomputed facemask spectral-density reference profile, the spectral-density values derived from the sample of depth values from the facial depth image, where analyzing the spectral-density values includes analyzing the filtered spectral-density values.

Example 22 is the one or more non-transitory computer-readable storage media of Example 21, where the precomputed facemask spectral-density reference profile includes a same number of reference spectral-density values as there are derived spectral-density values; and the filtering includes an element-wise multiplication of the reference spectral-density values and the derived spectral-density values.

Example 23 is the one or more non-transitory computer-readable storage media of any of the Examples 13-22, where analyzing the spectral-density values includes analyzing the spectral-density values together with one or more contextual values.

Example 24 is a system including cropping means for generating, from an image of a person, a facial depth image of a region of a face of the person; computation means for generating facial wavelet descriptors from the facial depth image, the computations means being also for determining spectral-density values of the wavelet descriptors; and classification means for analyzing the spectral-density values to generate a mask-wearing-compliance result for the person, the analyzing including using a classification model trained to classify sets of spectral-density values with respect to facemask wearing in images from which the spectral-density values were derived.

Example 25 is the system of Example 24, the operations further including identifying horizontal and vertical boundaries of a bounding frame of a face portion of an upper segment of the depth image; identifying first and second depth-dimension boundaries of a bounding box of the face portion from within a framed portion of the upper segment of the depth image, the framed portion being that portion that lies within the identified horizontal and vertical boundaries of the bounding frame, the bounding box having horizontal and vertical boundaries based on that of the bounding frame; and cropping the upper segment of the depth image down to the facial depth image based on the identified boundaries of the bounding box of the face portion.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Additionally, as used in this disclosure, phrases of the form "at least one of A and B," "at least one of A, B, and C," and the like should be interpreted as if the language "A and/or B," "A, B, and/or C," and the like had been used in its place. In this disclosure, unless explicitly stated otherwise in connection with a particular instance, this manner of phrasing does not mean "at least one A and at least one B," "at least one A, at least one B, and at least one C," and so on. As used in this disclosure, the two-element version covers each of the following: one or more of A and no B, one or more of B and no A, and one or more of A and one or more of B. And similarly for the three-element version and beyond. Similar construction should be given to such phrases in which "one or more" is used in place of "at least one," again, unless explicitly stated otherwise in connection with a particular instance.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A mask-compliance measurement system comprising:
a memory device to store a depth image of a person; and
a processor configured to:
generate, from the depth image of the person, a facial depth image of a region of a face of the person;
generate facial wavelet descriptors from the facial depth image;
determine spectral-density values of the facial wavelet descriptors; and
analyze the spectral-density values with a classification model to generate compliance data, the compliance data including (i) a classification result of whether the person is wearing a facemask and (ii) a confidence value or computed likelihood of the classification result of whether the person is wearing the facemask, wherein the classification model is trained to classify sets of spectral-density values with respect to facemask wearing in training depth images providing wavelet descriptors from which the sets of spectral-density values were derived.

2. The mask-compliance measurement system of claim 1, wherein the processor is further configured to:
identify boundaries of a bounding box of a face portion of an upper segment of the depth image; and
crop the upper segment of the depth image down to the facial depth image based on the identified boundaries of the bounding box of the face portion.

3. The mask-compliance measurement system of claim 2, wherein the processor being configured to identify the boundaries of the bounding box of the face portion comprises the processor being configured to:
delineate the upper segment of the depth image into a plurality of horizontal strips; and
identify first and second horizontal boundaries of the bounding box of the face portion based on an extent of horizontal symmetry of at least one of the horizontal strips.

4. The mask-compliance measurement system of claim 2, wherein the processor being configured to identify the boundaries of the bounding box of the face portion comprises the processor being configured to:
delineate the upper segment of the depth image of the person into a plurality of vertical strips; and
identify first and second vertical boundaries of the bounding box of the face portion based on an identification of a plurality of inflection points of at least one of the vertical strips.

5. The mask-compliance measurement system of claim 2, wherein the processor being configured to identify the boundaries of the bounding box of the face portion comprises the processor being configured to:
identify horizontal and vertical boundaries of a bounding frame of the face portion; and
identify first and second depth-dimension boundaries of the bounding box of the face portion from within a framed portion of the upper segment of the depth image, the framed portion being that portion that lies within the identified horizontal and vertical boundaries of the bounding frame.

6. The mask-compliance measurement system of claim 5, wherein the processor being configured to identify the first and second depth-dimension boundaries of the bounding box of the face portion comprises the processor being configured to:
delineate the framed portion into a plurality of different sets of depth-dimension strips, each of the sets of depth-dimension strips comprising a different subset of points of the framed portion;
identify, for each of the sets of depth-dimension strips, an ellipsoid that contains the corresponding subset of points of the face portion and is within the framed portion; and
identify the first and second depth-dimension boundaries of the bounding box of the face portion based on identifying proximal and distal depth extremes of a largest-by-volume one of the plurality of ellipsoids.

7. The mask-compliance measurement system of claim 1, wherein:
the processor being configured to generate the facial wavelet descriptors from the facial depth image comprises the processor being configured to transform each depth value in a sample of depth values from the facial depth image into one of the facial wavelet descriptors; and
the processor being configured to determine the spectral-density values of the wavelet descriptors comprises the processor being configured to convert each of the facial wavelet descriptors into a corresponding spectral-density value.

8. The mask-compliance measurement system of claim 7, wherein an irreversible function is used to convert each of the facial wavelet descriptors into a corresponding spectral-density value.

9. The mask-compliance measurement system of claim 7, wherein:
the processor is further configured to generate filtered spectral-density values at least in part by filtering, using a precomputed facemask spectral-density reference profile, the spectral-density values derived from the sample of depth values from the facial depth image; and
the processor being configured to analyze the spectral-density values comprises the processor being configured to analyze the filtered spectral-density values.

10. The mask-compliance measurement system of claim 9, wherein:
the precomputed facemask spectral-density reference profile comprises a same number of reference spectral-density values as there are derived spectral-density values; and
the filtering comprises an element-wise multiplication of the reference spectral-density values and the derived spectral-density values.

11. The mask-compliance measurement system of claim 1, wherein the processor being configured to analyze the spectral-density values comprises the processor being configured to analyze the spectral-density values together with one or more contextual values.

12. The mask-compliance measurement system of claim 11, wherein the one or more contextual values indicate one or more contextual conditions based on ambient weather and installation location of the mask-compliance measurement system.

13. One or more non-transitory computer-readable storage media having stored thereon instructions that, when executed by at least one hardware processor, cause the at least one hardware processor to perform operations comprising:
   generating, from depth image of a person, a facial depth image of a region of a face of the person;
   generating facial wavelet descriptors from the facial depth image;
   determining spectral-density values of the facial wavelet descriptors; and
   analyzing the spectral-density values with a classification model to generate compliance data, the compliance data including (i) a classification result of whether the person is wearing a facemask and (ii) a confidence value or computed likelihood of the classification result of whether the person is wearing the facemask, wherein the classification model is trained to classify sets of spectral-density values with respect to facemask wearing in training depth images providing wavelet descriptors from which the sets of spectral-density values were derived.

14. The one or more non-transitory computer-readable storage media of claim 13, the operations further comprising:
   identifying boundaries of a bounding box of a face portion of an upper segment of the depth image; and
   cropping the upper segment of the depth image down to the facial depth image based on the identified boundaries of the bounding box of the face portion.

15. The one or more non-transitory computer-readable storage media of claim 14, wherein the identifying of the boundaries of the bounding box of the face portion comprises:
   delineating the upper segment of the depth image into a plurality of horizontal strips; and
   identifying first and second horizontal boundaries of the bounding box of the face portion based on an extent of horizontal symmetry of at least one of the horizontal strips.

16. The one or more non-transitory computer-readable storage media of claim 14, wherein identifying the boundaries of the bounding box of the face portion comprises:
   delineating the upper segment of the depth image of the person into a plurality of vertical strips; and
   identifying first and second vertical boundaries of the bounding box of the face portion based on an identification of a plurality of inflection points of at least one of the vertical strips.

17. The one or more non-transitory computer-readable storage media of claim 14, wherein identifying the boundaries of the bounding box of the face portion comprises:
   identifying horizontal and vertical boundaries of a bounding frame of the face portion; and
   identifying first and second depth-dimension boundaries of the bounding box of the face portion from within a framed portion of the upper segment of the depth image, the framed portion being that portion that lies within the identified horizontal and vertical boundaries of the bounding frame.

18. The one or more non-transitory computer-readable storage media of claim 17, wherein identifying the first and second depth-dimension boundaries of the bounding box of the face portion comprises:
   delineating the framed portion into a plurality of different sets of depth-dimension strips, each of the sets of depth-dimension strips comprising a different subset of points of the framed portion;
   identifying, for each of the sets of depth-dimension strips, an ellipsoid that contains the corresponding subset of points of the face portion and is within the framed portion; and
   identifying the first and second depth-dimension boundaries of the bounding box of the face portion based on identifying proximal and distal depth extremes of a largest-by-volume one of the plurality of ellipsoids.

19. The one or more non-transitory computer-readable storage media of claim 13, wherein:
   generating the facial wavelet descriptors from the facial depth image comprises transforming each depth value in a sample of depth values from the facial depth image into one of the facial wavelet descriptors; and
   determining the spectral-density values of the wavelet descriptors comprises converting each of the facial wavelet descriptors into a corresponding spectral-density value.

20. The one or more non-transitory computer-readable storage media of claim 19, wherein an irreversible function is used to convert each of the facial wavelet descriptors into a corresponding spectral-density value.

21. The one or more non-transitory computer-readable storage media of claim 19, the operations further comprising:
   generating filtered spectral-density values at least in part by filtering, using a precomputed facemask spectral-density reference profile, the spectral-density values derived from the sample of depth values from the facial depth image,
   wherein analyzing the spectral-density values comprises analyzing the filtered spectral-density values.

22. The one or more non-transitory computer-readable storage media of claim 21, wherein:
   the precomputed facemask spectral-density reference profile comprises a same number of reference spectral-density values as there are derived spectral-density values; and
   the filtering comprises an element-wise multiplication of the reference spectral-density values and the derived spectral-density values.

23. The one or more non-transitory computer-readable storage media of claim 13, wherein analyzing the spectral-density values comprises analyzing the spectral-density values together with one or more contextual values.

24. A system comprising:
   cropping means for generating, from a depth image of a person, a facial depth image of a region of a face of the person;
   computation means for generating facial wavelet descriptors from the facial depth image and determining spectral-density values of the facial wavelet descriptors; and
   classification means for analyzing the spectral-density values with a classification model to generate compliance data, the compliance data including (i) a classification result of whether the person is wearing a facemask and (ii) a confidence value or computed likelihood of the classification result of whether the person is wearing the facemask, wherein the classification model is trained to classify sets of spectral-density values with respect to facemask wearing in training depth images providing wavelet descriptors from which the sets of spectral-density values were derived.

25. The system of claim 24, further comprising:
means for identifying horizontal and vertical boundaries of a bounding frame of a face portion of an upper segment of the depth image; and
means for identifying first and second depth-dimension boundaries of a bounding box of the face portion from within a framed portion of the upper segment of the depth image, the framed portion being that portion that lies within the identified horizontal and vertical boundaries of the bounding frame, the bounding box having horizontal and vertical boundaries based on that of the bounding frame; and
wherein the cropping means includes means for cropping the upper segment of the depth image down to the facial depth image based on the identified boundaries of the bounding box of the face portion.

* * * * *